(12) United States Patent
Gao et al.

(10) Patent No.: US 12,731,260 B2
(45) Date of Patent: Sep. 8, 2026

(54) RAPID, ACCURATE AND MACHINE-AGNOSTIC SEGMENTATION AND QUANTIFICATION METHOD AND DEVICE FOR CORONAVIRUS CT-BASED DIAGNOSIS

(71) Applicant: KING ABDULLAH UNIVERSITY OF SCIENCE AND TECHNOLOGY, Thuwal (SA)

(72) Inventors: Xin Gao, Thuwal (SA); Longxi Zhou, Thuwal (SA); Zhongxiao Li, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 604 days.

(21) Appl. No.: 17/917,036

(22) PCT Filed: Apr. 12, 2021

(86) PCT No.: PCT/IB2021/053012
§ 371 (c)(1),
(2) Date: Oct. 5, 2022

(87) PCT Pub. No.: WO2021/209887
PCT Pub. Date: Oct. 21, 2021

(65) Prior Publication Data

US 2023/0154006 A1 May 18, 2023

Related U.S. Application Data

(60) Provisional application No. 63/009,026, filed on Apr. 13, 2020.

(51) Int. Cl.

| | |
|---|---|
| ***G06T 7/11*** | (2017.01) |
| ***G06T 7/00*** | (2017.01) |
| *G06N 3/02* | (2006.01) |

(52) U.S. Cl.
CPC .............. *G06T 7/11* (2017.01); *G06T 7/0012* (2013.01)

(58) Field of Classification Search
CPC . G06T 2207/10081; G06T 2207/20081; G06T 2207/20084; G06T 2207/30061;
(Continued)

(56) References Cited

U.S. PATENT DOCUMENTS

2021/0304408 A1* 9/2021 Chaganti .................. G06T 7/11

OTHER PUBLICATIONS

Shikha et al. "Automated Quantification of CT Patterns associated with covid-19 from chest CT", Apr. 2, 2020, pp. 1-30. Cited in IDS. (Year: 2020).*

(Continued)

*Primary Examiner* — Chad Dickerson
(74) *Attorney, Agent, or Firm* — PATENT PORTFOLIO BUILDERS PLLC

(57) ABSTRACT

A machine-agnostic segmentation and quantification method for coronavirus diagnostic includes receiving computer tomograph, CT, raw scans; normalizing the CT raw scans to obtain normalized data, wherein the normalized data is normalized in terms of dimension, resolution, and signal intensity; generating augmented data based on (1) the CT raw scans and (2) a simulation model; segmenting three different 2-dimensional, 2D, images from the normalized data, which correspond to a same voxel, $s$, using three functions $f_{xy}^{s}$, $f_{yz}^{s}$, and $f_{xz}^{s}$, respectively; and quantizing (508) each voxel $s$ to have a value of 0 or 1, based on the three functions $f_{xy}^{s}$, $f_{yz}^{s}$, and $f_{xz}^{s}$ and an aggregation function g. The value 0 indicates that the voxel is not infected with the coronavirus, and the value 1 indicates that the voxel is infected with the coronavirus, and the three functions $f_{xy}^{s}$, $f_{yz}^{s}$, and $f_{xz}^{s}$ are trained based on the augmented data.

16 Claims, 16 Drawing Sheets

(58) Field of Classification Search
CPC ........... G06T 7/0012; G06T 7/11; G06N 3/02; G16H 50/00; G16H 50/50
USPC ........................................................ 382/128
See application file for complete search history.

(56) References Cited

OTHER PUBLICATIONS

Prasoon et al. "Deep Feature Learning for Knee Cartilage Segmentation using a Triplanar CNN", Jan. 2013, pp. 1-9. (Year: 2013).*
Hui et al. "A Partitioning-Stacking Prediction Fusion Network Based on an Improved Attention U-Net for Stroke Lesion Segmentation" IEEE Access. (Year: 2020).*
Cui et al. "Pulmonary Vessel Segmentation Based on Orthogonal Fused U-Net++ of Chest CT Images". Date: Oct. 2019. Sense Time Research. (Year: 2019).*
Anthimopoulos, M., et al., "Lung Pattern Classification for Interstitial Lung Diseases Using a Deep Convolutional Neural Network," IEEE Transactions on Medical Imaging, May 2016, vol. 35, No. 5, pp. 1207-1216, IEEE.
Bai, H.X., et al., "Performance of Radiologists in Differentiating COVID-19 from Non-COVID-19 Viral Pneumonia on Chest CT," Radiology, Mar. 10, 2020, vol. 296, No. 2, p. E46-E54.
Bhandary, A., et al., "Deep-Learning Framework to Detect Lung Abnormality—A Study with Chest X-Ray and Lung CT Scan Images," Pattern Recognition Letters, Nov. 12, 2019, vol. 129, pp. 271-278, Elsevier B.V.
Chaganti, S., et al., "Quantification of Tomographic Patterns Associated with COVID-19 from Chest CT," arxiv.org, Cornell University Library, 201 Olin Library Cornell University, Ithaca, NY 14853, Apr. 2, 2020, pp. 1-30.
Chhikara, P., et al., "Deep Convolutional Neural Network with Transfer Learning for Detecting Pneumonia on Chest X-Rays," Singapore, 2020: Springer Singapore, in Advances in Bioinformatics, Multimedia, and Electronics Circuits and Signals, Oct. 2019, pp. 155-168, Springer Nature Singapore Pte Ltd.
Christe, A., et al., "Computer-Aided Diagnosis of Pulmonary Fibrosis Using Deep Learning and CT Images," Investigative Radiology, Oct. 2019, vol. 54, No. 10, pp. 627-632.
Çiçek, O., et al., "3D U-Net: Learning Dense Volumetric Segmentation from Sparse Annotation," Jun. 21, 2016, arXiv:1606.06650, Available Online: (http://arxiv.org/abs/1606.06650).
Cui, H., et al., "Pulmonary Vessel Segmentation Based on Orthogonal Fused U-Net++ of Chest CT Images," Medical Image Computing and Computer Assisted Intervention—MICCAI 2019, Oct. 10, 2019, pp. 293-300, Springer.
Garin, N., et al., "Rational Use of CT-Scan for the Diagnosis of Pneumonia: Comparative Accuracy of Different Strategies," Journal of Clinical Medicine, Apr. 15, 2019, vol. 8, No. 4, pp. 1-9.
Garin, N., et al., "Computed Tomography Scan Contribution to the Diagnosis of Community-Acquired Pneumonia," Current Opinion in Pulmonary Medicine, May 2019, vol. 25, No. 3, pp. 242-248, Wolters Kluwer Health, Inc.
Godet, C., et al., "Benefit of CT Scanning for Assessing Pulmonary Disease in the Immunodepressed Patient," Diagnostic and Interventional Imaging, Jun. 2012, vol. 93, No. 6, pp. 425-430, Elsevier Masson SAS.
Hesamian, M.H., et al., "Deep Learning Techniques for Medical Image Segmentation: Achievements and Challenges," Journal of Digital Imaging, May 29, 2019, vol. 32, pp. 582-596, Springer.
International Search Report in corresponding/related International Application No. PCT/IB2021/053012, date of mailing Jun. 28, 2021.
Kermany, D.S., et al., "Identifying Medical Diagnoses and Treatable Diseases by Image-Based Deep Learning," Cell, Feb. 22, 2018, vol. 172, No. 5, pp. 1122-1131, Elsevier Inc.
Koo, H.J., et al., "Radiographic and CT Features of Viral Pneumonia," Radiographics, May-Jun. 2018, vol. 38, No. 3, pp. 719-739.
Li, X., et al., "H-DenseUNet: Hybrid Densely Connected UNet for Liver and Tumor Segmentation From CT Volumes," IEEE Transactions on Medical Imaging, Dec. 2018, vol. 37, No. 12, pp. 2663-2674, IEEE.
Milletari, F., et al., "V-Net: Fully Convolutional Neural Networks for Volumetric Medical Image Segmentation," 2016 Fourth International Conference on 3D Vision (3DV), Oct. 25-28, 2016, pp. 565-571, IEEE.
Narin, A., et al., "Automatic Detection of Coronavirus Disease (COVID-19) Using X-ray Images and Deep Convolutional Neural Networks," arXiv e-prints, Mar. 2020, p. arXiv:2003.10849, pp. 1-31, Available online (https://ui.adsabs.harvard.edu/abs/2020arXiv200310849N).
Perslev, M., et al., "One Network to Segment Them All: A General, Lightweight System for Accurate 3D Medical Image Segmentation," Nov. 5, 2019, arXiv:1911.01764v1, Available Online: (http://arxiv.org/abs/1911.01764).
Rajpurkar, P., et al., "CheXNet: Radiologist-Level Pneumonia Detection on Chest X-Rays with Deep Learning," Dec. 25, 2017, V3, arXiv e-prints, p. arXiv:1711.05225, Available Online: (https://ui.adsabs.harvard.edu/abs/2017arXiv171105225R).
Saraiva, A.A., et al., "Classification of Images of Childhood Pneumonia using Convolutional Neural Networks," Bioimaging, Proceedings of the 12th International Joint Conference on Biomedical Engineering Systems and Technologies (Biostec 2019), pp. 112-119, Science and Technology Publications, Lda.
Shan, F., et al., "Lung Infection Quantification of COVID-19 in CT Images with Deep Learning," arXiv e-prints, p. arXiv:2003.04655, Available Online: (https://ui.adsabs.harvard.edu/abs/2020arXiv200304655S).
Shi, F., et al., "Review of Artificial Intelligence Techniques in Imaging Data Acquisition, Segmentation and Diagnosis for COVID-19," arxiv.org, Cornell University Library, 201 Olin Library Cornell University, Ithaca, NY 14853, Apr. 6, 2020, pp. 1-11.
Silver, D., et al., "Mastering the Game of Go without Human Knowledge," Nature, Oct. 19, 2017, vol. 550, No. 7676, pp. 1-42.
Valanarasu, J.M.J., et al., Learning to Segment Brain Anatomy from 2D Ultrasound with Less Data, Dec. 2019, arXiv:1912.08364, Available Online: (http://arxiv.org/abs/1912.08364).
Verma, G., et al., "Pneumonia Classification using Deep Learning in Healthcare," International Journal of Innovative Technology and Exploring Engineering (IJITEE), Feb. 2020, vol. 9, Issue 4, pp. 1715-1723, Blue Eyes Intelligence Engineering & Sciences Publication.
Walsh, S.L.F., et al., "Deep Learning for Classifying Fibrotic Lung Disease on High-Resolution Computed Tomography: A Case-Cohort Study," Lancet Respiratory Medicine, Sep. 16, 2018, vol. 6, No. 11, pp. 837-845.
Wang, S., et al., "A Deep Learning Algorithm using CT Images to Screen for Corona Virus Disease (COVID-19)," medRxiv, Feb. 18, 2020, p. 2020.02.14.20023028, 2020, doi: 10.1101/2020.02.14.20023028.
Written Opinion of the International Searching Authority in corresponding/related International Application No. PCT/IB2021/053012, date of mailing Jun. 28, 2021.
Xu, X., et al., "A Deep Learning System to Screen Novel Coronavirus Disease 2019 Pneumonia," Engineering, Jun. 27, 2020, vol. 6, pp. 1122-1129, Elsevier LTD.
Ying, S., et al., "Deep Learning Enables Accurate Diagnosis of Novel Coronavirus (COVID-19) with CT Images," medRxiv, Feb. 25, 2020, p. 2020.02.23.20026930, 2020, doi: 10.1101/2020.02.23.20026930.
Zhou, L., et al., "A Rapid, Accurate and Machine-Agnostic Segmentation and Quantification method for CT-Based COVID-19 Diagnosis," IEEE Transactions on Medical Imaging, Jun. 11, 2020, vol. 39, No. 8, pp. 2638-2652.
Zhou, Y., et al., "D-UNet: A Dimension-Fusion u Shape Network for Chronic Stroke Lesion Segmentation," IEEE/ACM Transactions on Computational Biology and Bioinformatics, Sep. 6, 2019, pp. 1-11, IEEE.

* cited by examiner

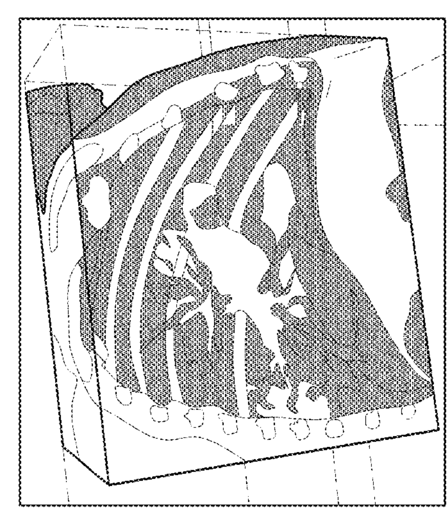
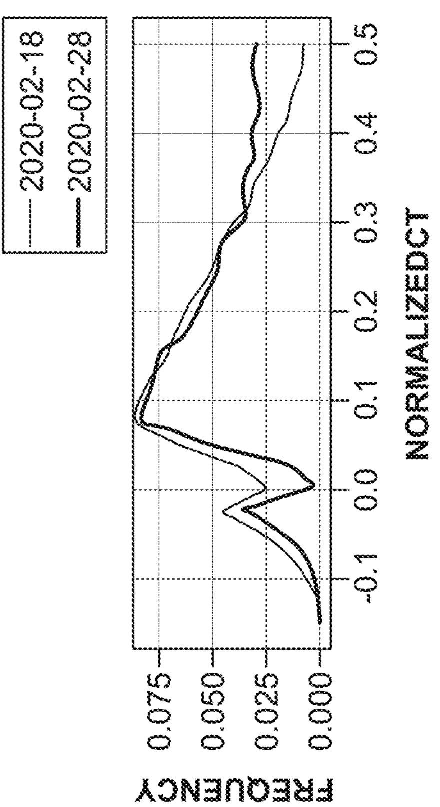
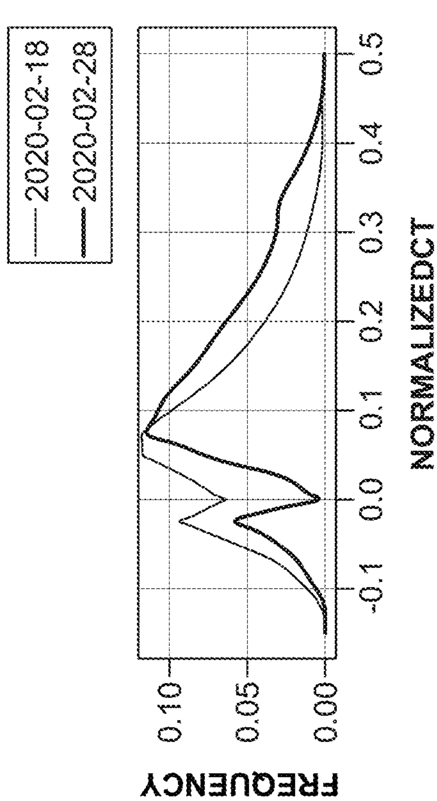
FIG. 4C(I)

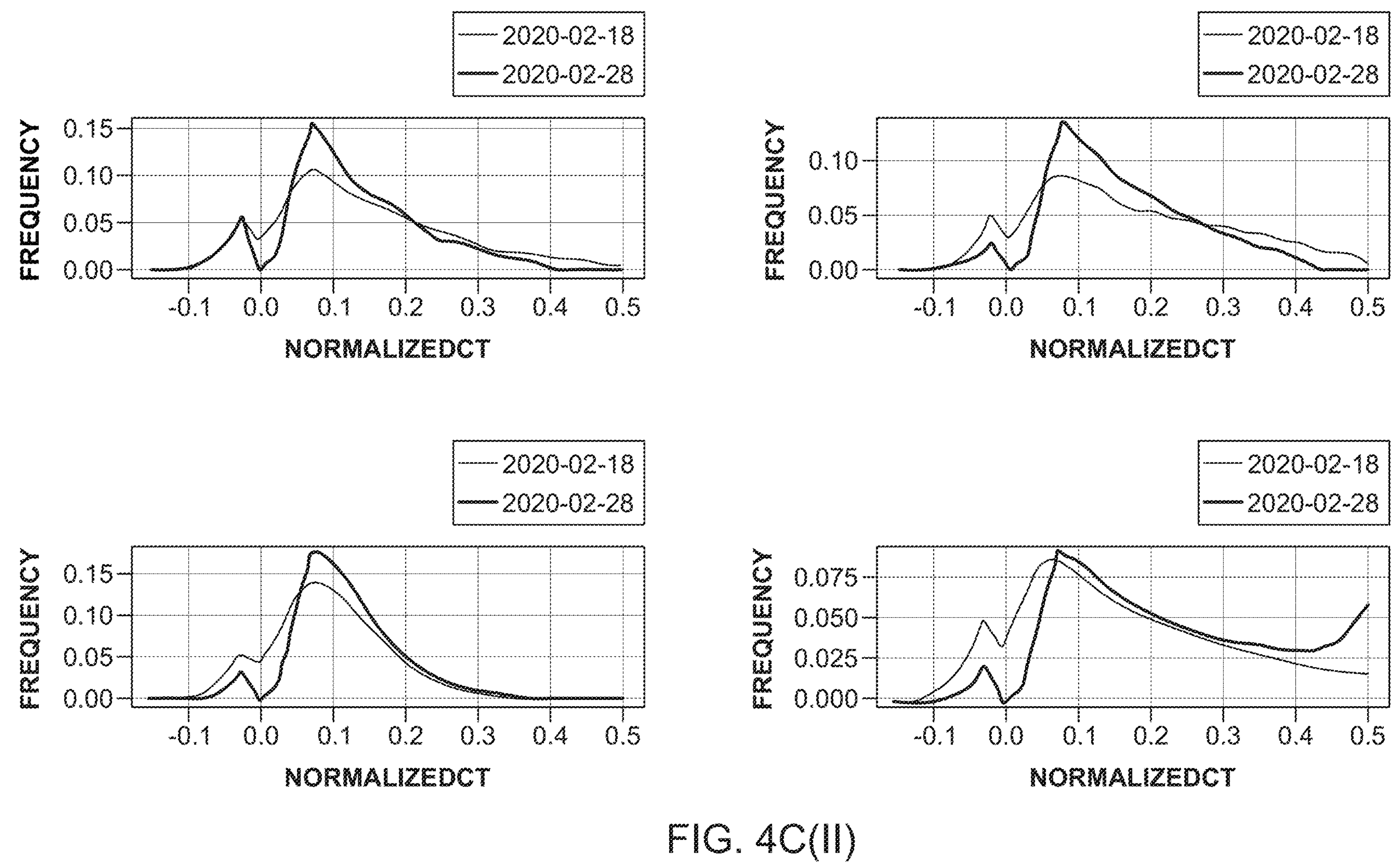
FIG. 4C(II)

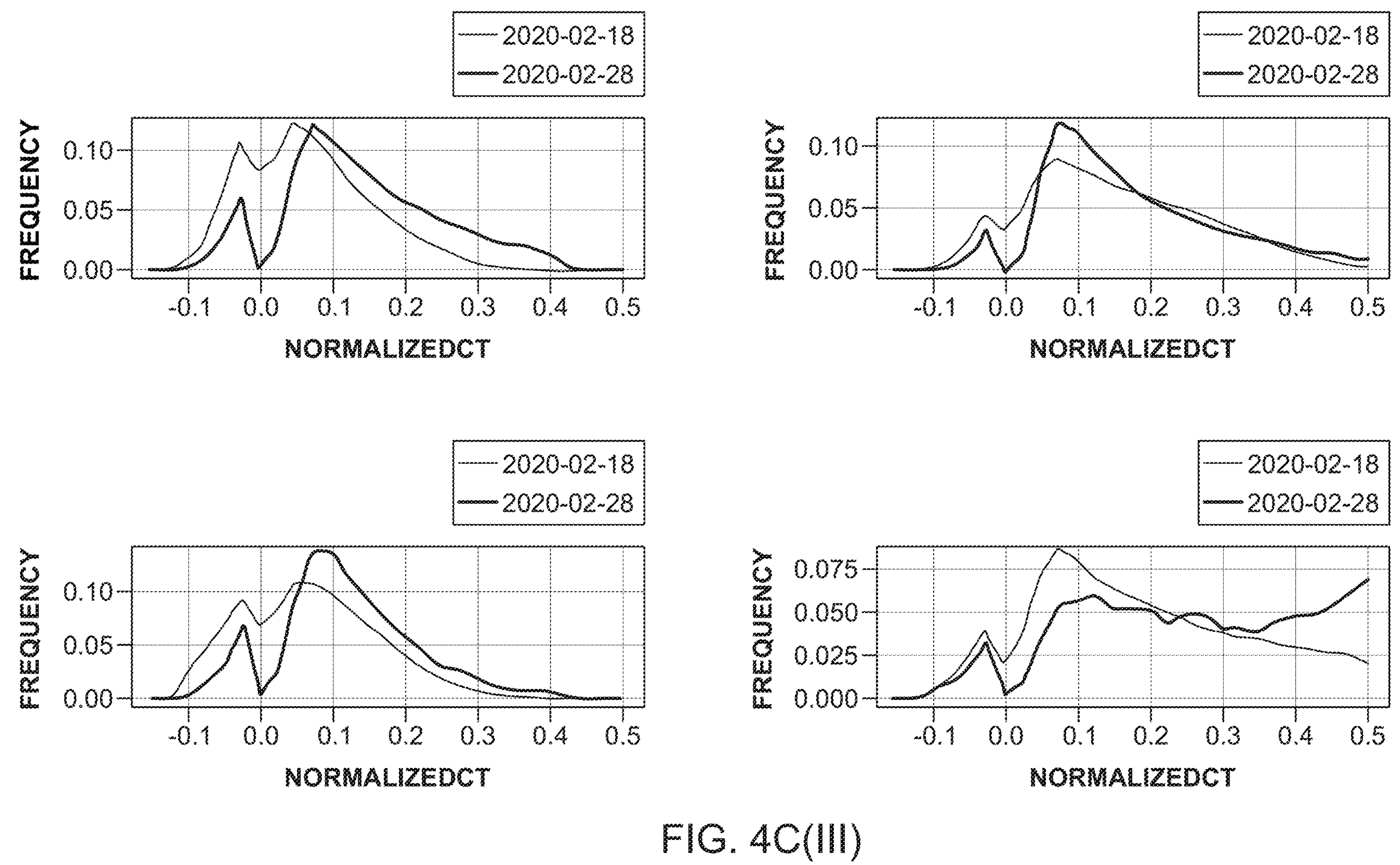
FIG. 4C(III)

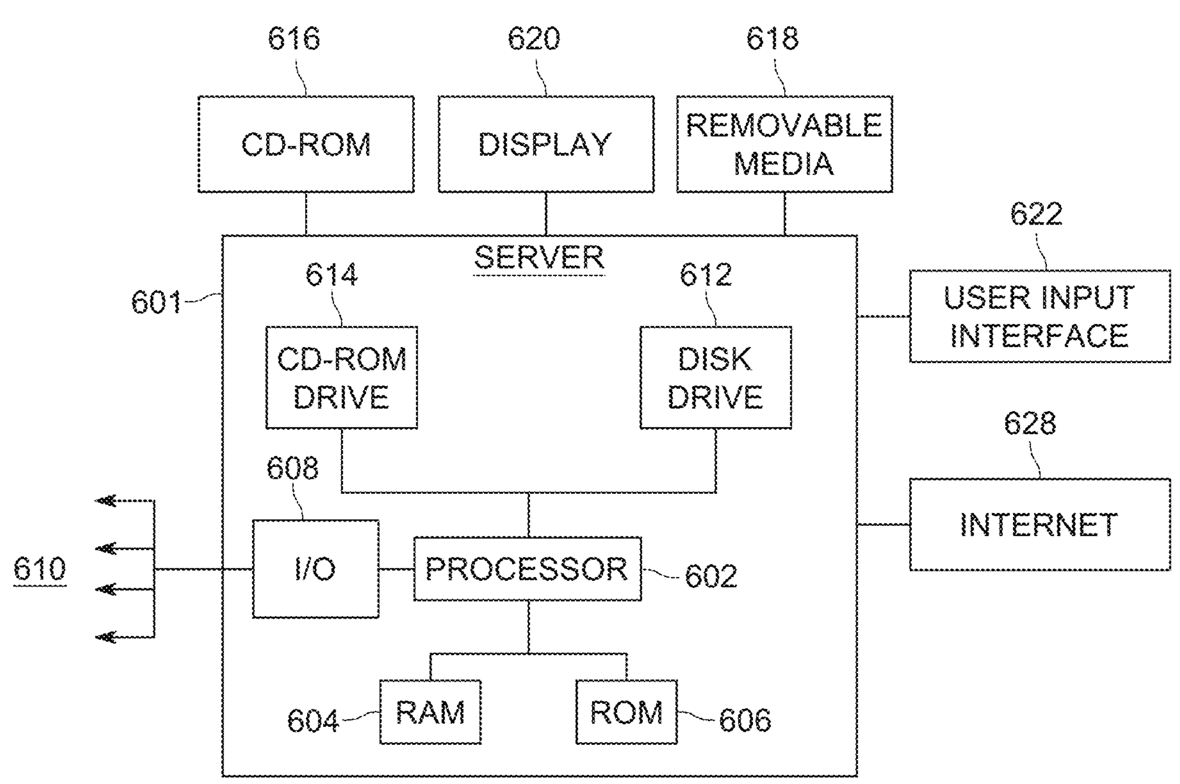
FIG. 6

| | The Harbin Dataset | | | | | | The Riyadh Dataset | |
|---|---|---|---|---|---|---|---|---|
| Hospital ID | A | A | B | B | C | D | E | E |
| CT scanner ID | 1 | 2 | 3 | 4 | 5 | 6 | 7 | 8 |
| Number of patients | 50 | 10 | 13 | 7 | 55 | 5 | 17 | 3 |
| Infection annotation | Voxel-level | Voxel-level | Voxel-level | Voxel-level | Voxel-level | Voxel-level | ROI-level | ROI-level |
| CT scanner | Brilliance iCT, Philips | Somatom Definition Edge, Siemens | Brilliance 16P CT, Philips | SOMATOM Scope, Siemens | GE 16-slice CT scanner | Brilliance iCT, Philips | Somatom Definition Edge, Siemens | Brilliance 16P CT, Philips |
| Number of Slices | 256 | 64 | 16 | 16 | 16 | 256 | 128 | 16 |
| Tube voltage (kVp) | 120 | 120 | 120 | 110 | 120 | 120 | 100 | 140 |
| Collimation (mm) | 128x0.625 | 128x0.6 | 16x1.5 | 16x1.2 | 16x1.25 | 128x0.625 | 128x0.6 | 128x0.625 |
| Matrix | 512x512 | 512x512 | 512x512 | 512x512 | 512x512 | 512x512 | 512x512 | 512x512 |
| Rotation time (second) | 0.35 | 0.5 | 0.75 | 0.6 | 1.0 | 0.35 | 0.28 | 0.35 |
| Pitch | 1.0 | 1.2 | 0.938 | 1.5 | 1.75 | 1.0 | 1.0 | 1.0 |
| Slice thickness (mm) | 5 | 5 | 5 | 5 | 5 | 5 | 2 | 2 |
| Slice increment (mm) | 5 | 5 | 5 | 5 | 5 | 5 | 2 | 2 |
| **After thin-slice reconstruction** | | | | | | | | |
| Slice thickness (mm) | 1 | 1 | 5 | 2 | 1.25 | 1 | 1 | 1 |
| Lung window level (HU) | -600 | -600 | -600 | -600 | -550 | -600 | -400 | -500 |
| Lung window width (HU) | 1600 | 1600 | 1200 | 1200 | 1500 | 1600 | 1400 | 1500 |

FIG. 7

| Methods | The Harbin dataset | | |
|---|---|---|---|
| | dice | recall | worst-case |
| FIG. 5 | **0.783±0.080** | 0.776±0.072 | **(0.577, 0)** |
| 2D U-net | 0.565±0.275 | 0.625±0.292 | (0.097, 13) |
| H-DUNet | 0.597±0.104 | **0.802±0.058** | (0.124, 3) |
| MPUnet | 0.449±0.206 | 0.448±0.190 | (0.000, 31) |
| 3D U-net | 0.621±0.112 | 0.702±0.111 | (0.032, 12) |
| 3D V-net | 0.641±0.187 | 0.769±0.123 | (0.049, 8) |
| FIG. 5* | **0.783±0.080** | 0.776±0.072 | - |
| 2D U-net* | 0.593±0.273 | 0.636±0.291 | - |
| H-DUNet* | 0.605±0.102 | **0.803±0.058** | - |
| MPUnet* | 0.559±0.165 | 0.496±0.155 | - |
| 3D U-net* | 0.658±0.105 | 0.707±0.109 | - |
| 3D V-net* | 0.667±0.182 | 0.770±0.123 | - |
| FIG. 5# | **0.802±0.072** | 0.794±0.068 | **(0.656, 0)** |
| 2D U-net# | 0.617±0.189 | 0.653±0.202 | (0.201, 0) |
| H-DUNet# | 0.643±0.095 | **0.823±0.042** | (0.377, 0) |
| MPUnet# | 0.543±0.118 | 0.566±0.095 | (0.236, 0) |
| 3D U-net# | 0.706±0.084 | 0.779±0.75 | (0.334, 0) |
| 3D V-net# | 0.708±0.100 | 0.788±0.71 | (0.385, 0) |
| FIG. 5@ | **0.903±0.037** | 0.898±0.032 | **(0.728, 0)** |
| 2D U-net@ | 0.767±0.169 | 0.787±0.163 | (0.224, 0) |
| H-DUnet@ | 0.820±0.053 | **0.904±0.021** | (0.477, 0) |
| MPUnet@ | 0.683±0.138 | 0.660±0.095 | (0.254, 0) |
| 3D U-net@ | 0.826±0.084 | 0.849±0.077 | (0.424, 0) |
| 3D V-net@ | 0.855±0.055 | 0.887±0.050 | (0.503, 0) |

FIG. 8

STAGE-SPECIFIC SEGMENTATION PERFORMANCE

| Methods | The Harbin dataset | | |
|---|---|---|---|
| | Early | Progressive | Severe |
| Percentage | 73.1% | 18.7% | 8.2% |
| CURRENT METHOD | **0.764** | **0.823** | **0.875** |
| 2D U-net | 0.508 | 0.703 | 0.755 |
| H-DUnet | 0.526 | 0.788 | 0.803 |
| MPUnet | 0.370 | 0.618 | 0.766 |
| 3D U-net | 0.551 | 0.802 | 0.820 |
| 3D V-net | 0.581 | 0.796 | 0.824 |

FIG. 9

| Methods | The Harbin dataset | | |
|---|---|---|---|
| | RMSE | PCC | Worst-RSE |
| CURRENT METHOD | **0.025** | **0.967** | **0.049** |
| 2D U-net | 0.076 | 0.909 | 0.317 |
| H-DUnet | 0.072 | 0.927 | 0.304 |
| MPUnet | 0.092 | 0.825 | 0.276 |
| 3D U-net | 0.056 | 0.948 | 0.167 |
| 3D V-net | 0.048 | 0.943 | 0.175 |

FIG. 10

| Methods | Augmentation Ratio | | | | | |
|---|---|---|---|---|---|---|
| | 0% | 50% | 100% | 200% | 300% | 400% |
| CURRENT | 0.685 | 0.756 | 0.778 | **0.783** | 0.765 | 0.741 |
| 2D U-net | 0.492 | 0.537 | 0.553 | **0.565** | 0.563 | 0.561 |
| H-DUnet | 0.526 | 0.557 | 0.581 | **0.597** | 0.590 | 0.585 |
| MPUnet | 0.433 | 0.442 | 0.453 | 0.449 | **0.457** | 0.445 |
| 3D U-net | 0.571 | 0.606 | **0.630** | 0.621 | 0.609 | 0.597 |
| 3D V-net | 0.593 | 0.622 | **0.649** | 0.641 | 0.611 | 0.595 |

FIG. 11

| Methods | # Parameters | Prediction | Training | Memory |
|---|---|---|---|---|
| CURRENT MODEL | 8.6M | 15 sec | 5.5 h | 128 GB |
| 2D U-net | **2.9M** | **10 sec** | **2 h** | **64 GB** |
| H-DUnet | 49M | ~18 min | 20 h | 128 GB |
| MPUnet | 62M | ~12 min | 24 h | 128 GB |
| 3D U-net | 4.1M | ~3 min | 10 h | 128 GB |
| 3D V-net | 12M | ~3 min | 9 h | 128 GB |

FIG. 12

RAPID, ACCURATE AND MACHINE-AGNOSTIC SEGMENTATION AND QUANTIFICATION METHOD AND DEVICE FOR CORONAVIRUS CT-BASED DIAGNOSIS

CROSS-REFERENCE TO RELATED APPLICATIONS

This application is a U.S. National Stage Application of International Application No. PCT/IB2021/053012, filed on Apr. 12, 2021, which claims priority to U.S. Provisional Patent Application No. 63/009,026, filed on Apr. 13, 2020, entitled "A RAPID, ACCURATE AND MACHINE-AGNOSTIC SEGMENTATION AND QUANTIFICATION METHOD FOR CT-BASED COVID-19 DIAGNOSIS," the disclosures of which are incorporated herein by reference in their entirety.

BACKGROUND

Technical Field

Embodiments of the subject matter disclosed herein generally relate to a system and method for automatic diagnosing of a coronavirus infection based on a machine-agnostic procedure, and more particularly, to using computer tomography (CT) images combined with automatic computer segmentation and quantification.

Discussion of the Background

The coronavirus disease 2019 (COVID-19), the infectious disease caused by the severe acute respiratory syndrome coronavirus 2 (SARS-CoV-2), has become a global pandemic and the most urgent threat facing the entire population. It also poses a grand challenge to the scientific community to cope with the dire need for sensitive, accurate, rapid, affordable and simple diagnostic technologies.

SARS-CoV-2 is an RNA virus and belongs to a broad family of viruses known as coronaviruses. It consists of a positive-sense single-stranded RNA, and four main structural proteins, including the spike (S) proteins, the envelope (E) proteins, the membrane (M) proteins, and the nucleocapsid (N) proteins. Accordingly, there are three ways to detect the virus from patients' samples: (1) through the detection of the nucleic acids of the virus' RNA, (2) through the detection of the virus' gene sequences, and (3) through the detection of the antibodies produced by the patients' immune system. Therefore, it is the practice today that the diagnosis of COVID-19 should be confirmed by either the reverse transcription polymerase chain reaction (RT-PCR) or by gene sequencing.

However, due to the practical issues in sample collection and transportation, as well as the performance of the testing kits, especially at the initial presentation of the outbreak, such standards have been shown to have a high false negative rate. For example, among the 1014 COVID-19 patients in Wuhan up to Feb. 6, 2020, according to one study, only 59% (601 out of 1014) had positive RT-PCR results, whereas 88% (888 out of 1014) had positive chest computerized tomography (CT) scans. Among the ones (601) with positive RT-PCR, CT scan also achieved a 97% sensitivity (580 out of 601). This suggests that CT scans can not only detect most of the positive ones by RT-PCR, but also detect a lot more cases (about 30% more than the study mentioned above).

Therefore, CT scans have been widely used in many countries and have particularly shown great success in China to be one of the main diagnostic confirming standards for COVID-19. However, the problems with the existing methods that rely on CT scans is that there is a human factor involved in the process, i.e., a person with a high skill in the art of CT scans needs to review the scans and input additional data. In addition, the existing artificial intelligence (AI) machines that make use of the CT scans are trained and optimized towards certain datasets, which are often collected by the same CT machine, with the same parameters, and by the same radiologists. Thus, such models often become dataset-specific and lack generalization power on datasets from other machines, which hampers their practical usage. Further, the access to high-quality, annotated COVID-19 patients' data is often limited and restricted, which cannot provide data-hungry deep learning models with sufficient training data, especially at the early stage of COVID-19 that needs most help from the AI systems. Furthermore, most existing methods can only conduct the classification of COVID-19 patients, but cannot provide the segmentation and quantification of the infection volume, whereas the only method capable of doing so requires a high-level of human intervention, which is difficult to satisfy, especially during the outbreak.

Thus, there is a need for a new method and system that is capable of analyzing the CT scans independently of the CT scanner that collected the data, generates rapid, accurate, machine-agnostic segmentation and quantification, and does not require specialized input from a specialist.

BRIEF SUMMARY OF THE INVENTION

According to an embodiment, there is a machine-agnostic segmentation and quantification method for coronavirus diagnostic. The method includes receiving computer tomograph, CT, raw scans, normalizing the CT raw scans to obtain normalized data, wherein the normalized data is normalized in terms of dimension, resolution, and signal intensity; generating augmented data based on (1) the CT raw scans and (2) a simulation model; segmenting three different 2-dimensional, 2D, images from the normalized data, which correspond to a same voxel, $\mathcal{s}$, using three functions $f_{xy}^{\mathcal{s}}$, $f_{yz}^{\mathcal{s}}$,, and $f_{xz}^{\mathcal{s}}$,, respectively, and quantizing each voxel $\mathcal{s}$ to have a value of 0 or 1, based on the three functions $f_{xy}^{\mathcal{s}}$, $f_{yz}^{\mathcal{s}}$,, and $f_{xz}^{\mathcal{s}}$ and an aggregation function g. The value 0 indicates that the voxel is not infected with the coronavirus, and the value 1 indicates that the voxel is infected with the coronavirus, and the three functions $f_{xy}^{\mathcal{s}}$, $f_{yz}^{\mathcal{s}}$,, and $f_{xz}^{\mathcal{s}}$ are trained based on the augmented data.

According to another embodiment, there is a computing device that is machine-agnostic when segmenting and quantifying data for coronavirus diagnostic, and the computing device includes an interface configured to receive computer tomograph, CT, raw scans, and a processor connected to the interface. The processor is configured to normalize the CT raw scans to obtain normalized data, wherein the normalized data is normalized in terms of dimension, resolution, and signal intensity, generate augmented data based on (1) the CT raw scans and (2) a simulation model, segment three different 2-dimensional, 2D, images from the normalized data, which correspond to a same voxel, $\mathcal{s}$, using three functions $f_{xy}^{\mathcal{s}}$, $f_{yz}^{\mathcal{s}}$,, and $f_{xz}^{\mathcal{s}}$,, respectively, and quantize each voxel $\mathcal{s}$ to have a value of 0 or 1, based on the three functions $f_{xy}^{\mathcal{s}}$, $f_{yz}^{\mathcal{s}}$,, and $f_{xz}^{\mathcal{s}}$ and an aggregation function g.

The value 0 indicates that the voxel is not infected with the coronavirus, and the value 1 indicates that the voxel is infected with the coronavirus, and the three functions $f_{xy}^{s}$, $f_{yz}^{s}$, and $f_{xz}^{s}$ are trained based on the augmented data.

According to yet another embodiment, there is a non-transitory computer readable medium including computer executable instructions, wherein the instructions, when executed by a computer, implement the machine-agnostic segmentation and quantification method for coronavirus diagnostic discussed above.

BRIEF DESCRIPTION OF THE DRAWINGS

For a more complete understanding of the present invention, reference is now made to the following descriptions taken in conjunction with the accompanying drawings, in which:

FIGS. 4A to 4E illustrate the dynamic changes of the infection regions of the lung of a given patient and the intensity distributions functions for various voxels;

FIG. 6 is a schematic diagram of a computing device that can be used to implement the methods discussed herein;

FIG. 7 illustrates the imaging protocols used herein for 106 patients from 2 countries, 5 hospitals, and 8 CT scanners;

FIG. 8 illustrates the scan level segmentation performance for the method illustrated in FIG. 5 and other traditional methods;

FIG. 9 illustrates the stage-specific segmentation performance for the data discussed herein;

FIG. 10 illustrates the scan level quantification performance of the current method and the traditional methods;

FIG. 11 illustrates the analysis of the data augmentation for the current method and the traditional methods; and FIG. 12 illustrates the runtime and memory consumption of a computing device when running the current method and the traditional methods.

DETAILED DESCRIPTION OF THE INVENTION

Figure 1:
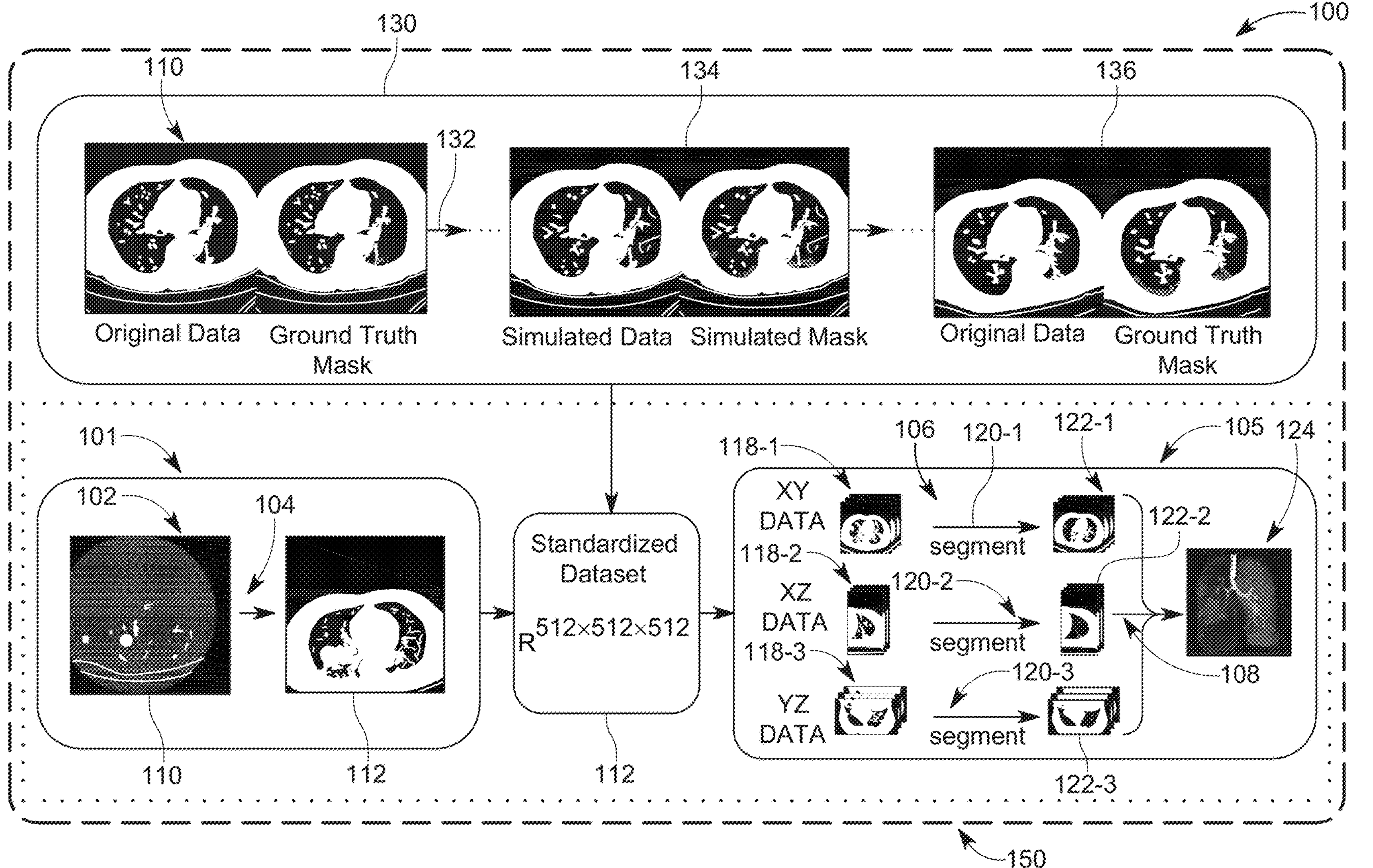
FIG. 1 is a schematic diagram of a process for implementing a machine-agnostic segmentation and quantification method for coronavirus diagnostic.

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to an AI system that accurately and machine-agnostic capable of segmentation and quantification of CT scans for diagnostic of COVID-19. However, the embodiments to be discussed next are not limited to the diagnostic of COVID-19, or only to CT scan raw data, but may be adapted for other diseases or conditions and may use other source data.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a novel coronavirus detection computing device includes an interface configured to receive CT raw scans and a processor connected to the interface and configured to normalize the CT raw scans to obtain normalized data, wherein the normalized data is normalized in terms of dimension, resolution, and signal intensity, generate augmented data based on (1) the CT raw scans and (2) a simulation model, segment three different 2-dimensional, 2D, images from the normalized data, which correspond to a same voxel, $s$, using three functions, respectively, and quantize each voxel $s$ to have a value of 0 or 1, based on the three functions and an aggregation function g. The value 0 indicates that the voxel is not infected with the coronavirus, and the value 1 indicates that the voxel is infected with the coronavirus. The three functions $f_{xy}^{s}$, $f_{yz}^{s}$, and $f_{xz}^{s}$ are trained based on the augmented data.

Before discussing the details of the new system and method for automatic segmentation and quantification based on CT scans, it is believed that a brief review of existing imagining methods for detecting lung diseases is in order. Imaging has long been used as the major diagnostic source for lung diseases, such as pneumonia, tuberculosis, and lung cancer. The most commonly used pneumonia imaging technologies are X-rays (or chest radiography) and CT scans. X-rays provide flattened 2D images whereas CT scans provide cross-sectional images that can be used to reconstruct the 3D model of the lung.

With the advances in artificial intelligence (AI) and its applications in various fields, especially computer vision and imaging, AI has been widely applied to X-rays- and CT-based detection and diagnosis of pneumonia. AI-based computer-aided diagnosis (CAD) systems are shown to be able to provide fast detection and diagnosis, and, in some cases, perform equally or even more accurately than professional radiologists. A variety of methods have thus been developed in the past decade. From the input data point of view, the existing AI-based methods can be classified into three categories: the ones that take X-rays as inputs, the ones that take CT scans as inputs [1-6], and the ones that can handle both [7]. From the extracted feature point of view, some of the existing methods are based on manually crafted features [7, 8], whereas the majority of the remaining ones are based on automatically extracting features by deep learning methods [1-6 and 9-8].

From the machine learning model point of view, it is not surprising to see that most of the existing methods [3-7 and 9-13] are based on convolutional neural networks (CNN) and its variants, which have achieved great success in computer vision and imaging tasks. In order to alleviate the insufficient data issue that commonly exists in biomedical imaging tasks, techniques like transfer learning [9, 11] and pre-training [7] have been applied.

Although X-rays have been serving as the fastest and most easily accessible screening tool for diagnosing pneumonia, it has been shown that X-rays are inferior to CT scans in detecting COVID-19 patients because the indicative characteristics of COVID-19 pneumonia are only visible in 3D information, such as ground grass opacity (GGO) lesions in the peripheral and posterior lung, and pulmonary nodules. The fast reading speed and the high sensitivity of CT scans in detecting COVID-19 patients make AI-based CAD systems based on CT scans an ideal approach to cope with the exponential expansion of the COVID-19 pandemic. A number of AI-based CAD systems have thus been very quickly developed and deployed as scientific efforts to combat this global crisis [14-19]. Due to the urgency of the needs, most of these methods are not focused on proposing novel, principled machine learning methods, but rather on quickly building a workable model by directly applying the off-the-shelf approach, e.g., CNN, ResNet, and inception networks.

The authors in [18] combined the CNN and ResNet models and trained a screening system for COVID-19 on a CT scan dataset consisting of 110 COVID-19 patients, 224 Influenza-A patients, and 175 healthy people. Their model achieved a classification accuracy of 86.7%. In a similar study, [17] applied a detailed relation extraction neural network (DRE-Net) model, called DeepPneumonia, and trained it on a CT image dataset with 88 COVID-19 patients, 101 bacteria pneumonia patients, and 86 healthy people, on which their model achieved an accuracy of 86% and AUROC (area under ROC) of 0.95. The authors in [16] first tried to reduce the complexity of the problem by extracting region of interest (ROI) images from the CT scans, then extracted feature vectors by a modified inception network, and finally used fully connected layers to differentiate COVID-19 images from the typical viral pneumonia images. On a dataset with 1065 CT images with 30% being the COVID-19 images, their model achieved a classification accuracy of 89.5%.

Although identifying and classifying COVID-19 patients from CT scans are important and timely needed for diagnosis purposes, there is an impending need from the front-line clinicians to segment and quantify the infection volume in patients' lungs. Such information has been shown to be critical to not only the diagnosis, but also for the prognosis and treatment of patients. For example, if a patients infection volume is higher than 50% of the entire lung, the death rate is very high. On the contrary, if a patients infection only happens in one of the five lung lobes, the prognosis is very promising. However, among the various efforts on developing CAD systems for COVID-19 diagnosis, there is only one method, to the inventors' knowledge, that can segment and quantify the infection regions from CT scans. The authors in [19] adopted a human-in-the-loop workflow, which starts from a small batch of manually segmented CT scans, builds an initial model based on this batch and applies to the next batch, asks the radiologists to correct the segmentation, refines the model, and goes to the next iteration. This machine learning model applies the 3D CNN that combines V-Net with the bottle-neck structure. Trained on 249 CT scans from 249 patients and tested on 300 CT scans from 300 patients, their active learning framework requires human experts to cut or add 9.17% of the final output to make the segmentation satisfactory.

Despite the great advances in developing AI-based CAD systems for CT-based COVID-19 classification, segmentation, and quantification, the existing methods still need high-quality, annotated COVID-19 patients' data, which is scarce, and need human intervention, which is undesired.

Recently, there have been trends to use 2D methods to accelerate and improve the performance of 3D models on 3D segmentation tasks. In the art, methods that fuse a stack of 2D segmentation models to get the 3D segmentation are called 2.5D models. In this regard, the authors in [20] merged the segmentation results from nine different views and reached the state-of-the-art performance in 13 segmentation tasks over four different datasets. The authors in [21, 22] fused multiple 2D models to improve the training time and performance on 3D medical image segmentation tasks. They found that by taking the merits of 2D segmentation models, their 2.5D methods sometimes outperformed state-of-the-art 3D models like 3D U-Net. In general, 2.5D models have the following advantages: 1) simplicity for training and refinement because the 2.5D models have much fewer hyper-parameters than the 3D models due to the much lower model complexity; 2) faster convergence rate because the 2.5D models usually have less parameters and lower memory requirement, they can often converge much faster than the 3D models; and 3) faster prediction time, as, for example, the authors in [23] used 2D segmentation models to reduce the prediction time for the 3D segmentation from 54 min to real-time.

To further improve the above discussed models, in this embodiment, a fully automatic, rapid, accurate, and machine-agnostic segmentation and quantification method for CT-based COVID-19 diagnosis is disclosed. This novel method has at least one of the following innovations: 1) for this large-scene-small-object problem with limited data, a novel algorithm is introduced which is programmed to decompose the 3D segmentation problem into three 2D ones by using the symmetry properties of the lung and other tissues, which reduces the number of model parameters by an order of magnitude and, at the same time, dramatically improves the segmentation accuracy; 2) a novel embedding strategy is introduced to project any CT scan into the same, standard space, which makes the model machine-agnostic and generalizable to any CT scan dataset; and 3) to resolve the data scarcity issue, a CT scan simulator for COVID-19 is introduced, which is configured to fit the dynamic change of real patients' data measured at different time points. Benefiting from one or more of these innovations, the process to be discussed next performs very well on segmenting and quantifying infection regions from CT scans of patients, especially the early stage ones, from multiple countries, multiple hospitals, and multiple machines, and thus provides critical information to the diagnosis, treatment, and prognosis of COVID-19 patients.

An overall workflow of the process 100 proposed herein is schematically illustrated in FIG. 1, and includes a pre-processing algorithm 101, which includes a step 102 of stacking the CT scan images 110 to a 3D tensor, and then a step 104 of normalizing the resolution, signal intensities, and the dimension (i.e., casting to the standard embedding space) to obtain spatial and signal normalized data 112. The method applies a segmentation algorithm 105, which uses three 2D U-Nets functions 120-1 to 120-3 in step 106 to segment 2D images 118-1 to 118-3 to find the infection regions, along three orthogonal directions, to generate three segmented masks 122-1 to 122-3, and integrates in step 108 the three segmented masks 122-1 to 122-3 together to get the final infection segmentation 124. The steps of the process 100 are implemented in software in a computing device 150, which is discussed later. To train the data-hungry deep learning model that generates the final infection segmentation 124, according to an embodiment, a data augmentation module 130 is developed to simulate the evolution of the infections, which can sample a large number of CT scans 110 for the training purpose. The module 130 can take the real CT raw data 110 at day 1 and real data 136 at day 6 and apply an evolution model 132 (to be discussed later) to generate the simulated or augmented data, e.g., the simulated data 134 at day 3 or any other day.

More specifically, the task of infection segmentation is to find a mapping between each voxel in the CT scan data and whether that voxel is infected or not, which is mathematically described as $\mathcal{F}:\mathbb{R}^{H\times W\times S}\rightarrow\{0,1\}^{H\times W\times S}$ where H×W is the image size (in pixels) of each CT image, and S is the number of images of the scan. Note that the term "segmentation" in this application means identifying each voxel of the 3D CT scan and associating each voxel with a corresponding score, between 0 and 1, where 0 means that there is no infection, and 1 means that there is infection. Because different CT scanners scan different volumes, and have different resolutions and parameters like H, W, and S, according to an embodiment, a data preprocessing method 101 is developed to embed any CT scan image into a machine-agnostic standard space.

Deep learning models (used for the segmentation procedure 105) are data hungry while the COVID-19 CT scan data 110 are rarely available or accessible. Since the data contain multiple time-point CT scans of the same patient, a dynamic simulation model 132 is developed (discussed later in more detail) to simulate the progression of the infection regions, i.e., from data 110 to augmented data 134, as schematically illustrated in FIG. 1. The simulation model 132 can generate a large amount of augmented or training data 134, which is highly similar to the real data. The dynamic parameters of the simulation model 132 are determined by fitting the model to the real data 110, 136. The simulation model 132 is then used to simulate any number (e.g., 200) of augmented data 134, i.e., CT scans, for each training sample, from which the augmented data are extracted. With the augmented data, the model achieves a much higher performance than the existing models.

The segmentation task is applied on 3D tensors, each having about $10^8$ voxels. However, the available training samples are limited, even after data augmentation. Classical 3D segmentation models like 3D U-Net require a colossal number of training samples, and their prediction speed is too slow for clinical use, especially during this peak time of the COVID-19. To overcome this difficulty, according to an embodiment, the 3D segmentation problem is decomposed into three 2D ones, along the x-y, y-z, and x-z planes, respectively. This decomposition tactic achieves a much higher performance than the classical 3D segmentation methods and the state-of-the-art 2.5D models, and the prediction time is only several seconds per CT scan. These steps are now discussed in more detail.

One of the main bottlenecks of the traditional AI-based CAD systems is that they are trained on a certain dataset, and thus, they may not be directly generalizable to other datasets. In addition, when the input data come from different hospitals and are taken by different machines with different parameters, most existing methods cannot handle them directly.

Figure 2:
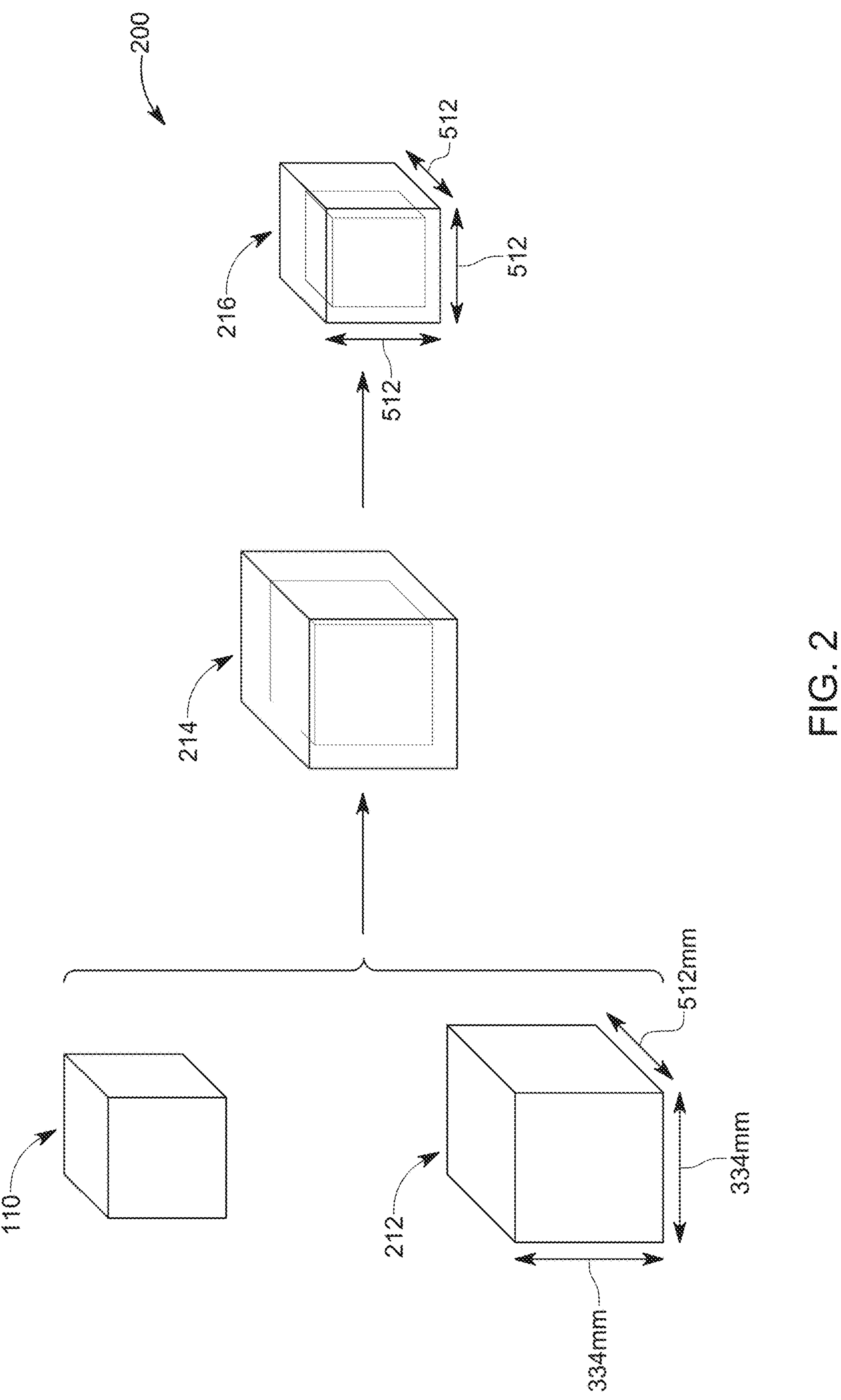
FIG. 2 schematically illustrates a spatial normalization performed on CT raw data for generating normalized data.

To overcome both issues, according to an embodiment, a preprocessing method 101 is applied that can project any lung CT scan to the same, standard space, so that the model used by the method can take heterogeneous datasets 110 as input, and can thus be machine-agnostic and applicable to any future dataset. Although preprocessing is a standard step in image analysis, to the inventors' knowledge, there is no method that simultaneously unifies (1) the resolution, (2) the dimension, and (3) the signal intensity in CT image processing. The preprocessing method 101 includes two normalization steps. The first one is a spatial normalization 200, as schematically illustrated in FIG. 2, which unifies the resolution and the dimension of the CT scan 110. The second normalization is the signal normalization, which standardizes the signal intensity of each voxel based on the lung windows of the CT scanners.

Figure 3:
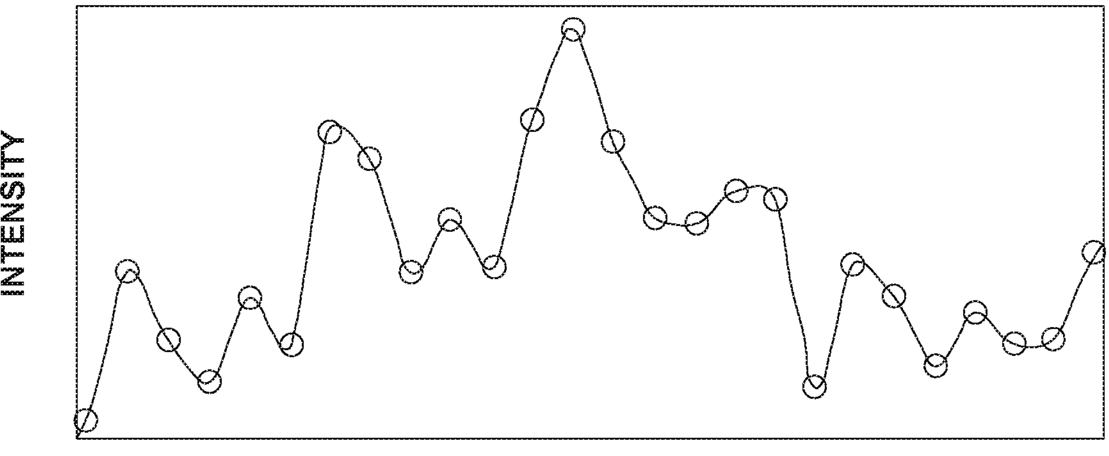
FIG. 3 schematically illustrates one possible interpolation method for obtaining the normalized data.

The spatial normalization 200 simultaneously unifies the resolution and the dimension of a given CT scan. Different CT scans 110 have different resolutions. For high-resolution scans, each voxel can correspond to a volume of 0.31×0.31×0.9 $mm^3$, while for low-resolution scans, each voxel can represent 0.98×0.98×2.5 $mm^3$. In the dataset 112, according to this embodiment, the CT resolution is selected to have a unique value, between the volume of the voxel for the high-resolution and the volume of the voxel for the low-resolution. For example, in this embodiment, the volume 212 of a voxel is selected to be $$\frac{334}{512}\times\frac{334}{512}\times 1\ \text{mm}^3,$$

which is chosen as the standard resolution for any CT scan. Thus, this embodiment requires that the standard embedding space S represents a volume of 334×334×512 $mm^3$, which is big enough to completely accommodate any human lung. Thus, $\mathcal{S}\in\mathbb{R}^{512\times 512\times 512}$. FIG. 2 shows that the raw CT data 110 has a different spatial resolution from the standard resolution 212. Thus, the spatial normalization procedure 200 aligns the centers of the data 110 and 212, which results in the data 214. It is noted that the raw CT data 110 can be smaller than the standard resolution 212, as shown in FIG. 2, or larger. Depending on the case, the raw data 110 is padded or cut to have the volume 334×334×512 $mm^3$. Note that the data 214 is obtained by translating the data 110 and 212. Then, the data 214 is resized to obtain the data 216, that has the standard resolution 212. One way to rescale the data 214 to data 216 is to use a Lanczos interpolation, as illustrated in FIG. 3, where the Y axis is the intensity and the X axis is the position of the 2D pixels of the image. Other ways may be used to rescale the data 214. The invariant in the spatial normalization method 200 is the volume of each voxel (i.e., the standard resolution) in $\mathcal{S}$.

The second normalization step of the preprocessing method 101 is the signal normalization. The values of the raw CT data 110 are in the Hounsfield Units (HU), which means that they are linearly normalized based on the X-ray attenuation coefficients of the water and the air. However, the HU unit is suboptimal for lung CT scans, because the average CT values of lung parenchyma vary in different datasets (e.g., from −400 HU to −600 HU in the used datasets).

In practice, experts set the lung window for each CT scanner, and the types of human tissues in the lung window are approximately invariant for all scanners, e.g., the window level is around the average CT value of lung parenchyma. Two quantities, window level (WL) and window width (WW), are commonly used to describe this lung window. The WL is defined as the central signal value of this window, and the WW is the width of this window, which determines the difference between the upper bound value and the lower bound value.

Thus, according to this embodiment, the WL and WW quantities are used to normalize the signal intensities and each voxel of $\mathcal{S}$ are subject to the following transformation:

$$I_{normalized}=\frac{I_{original}-WL}{WW},\qquad (1)$$

where $I_{original}$ is the CT signal intensity of the raw data 110, and $I_{normalized}$ is the corresponding signal intensity after signal normalization. The signal normalization can be considered as an analog to the original Hounsfield normalization, which removes the machine-specific parameters for the lung CT scans by setting the value of the lung parenchyma to 0 and casting the values of the human tissues in the lung window to the range of [−0.5, 0.5].

Thus, after the simultaneous spatial and signal normalization 104, any CT scan 110 will be cast into the standard embedding space S, which has the dimension of $\mathbb{R}^{512\times512\times512}$, the resolution (i.e., volume) of $$\frac{334}{512}\times\frac{334}{512}\times 1\ \text{mm}^3,$$

and the signal intensity range of [−0.5, 0.5]. This means that no matter what scanning device is used and what scanning parameters are selected by the operator of the scanning device, those scanning results are normalized to the above noted parameters.

Next, the training (related to module 130 in FIG. 1) of the deep learning model is discussed. Deep learning models are data hungry, which request not only a large amount of but also high-quality annotated data for training. Unfortunately, in many applications, especially bio-medical imaging, such data are rarely available or accessible. For example, the only publicly available image data collection for COVID-19 contains only X-ray data. In this regard, annotated data is defined here data collected by any device, X-ray device, CT scan device, etc., which was manually examined by a professional and further data was added by the professional. For example, in one embodiment, the following protocol is adopted for annotated data. The professional that manually segmentates CT scan data needs to do the following: 1) carefully delineate the contours for each infection region: if the infections have clear boundaries, carefully follow them; otherwise the contours should include all possible infection voxels, as step 2) and 3) will exclude redundant (normal) voxels; 2) choose an optimal CT signal threshold for each infection region to refine contours: some infections have unclear boundaries, luckily, they have higher CT signals than lung parenchyma. Thus, with a reasonable threshold (around −800 HU), it is possible to greatly enhance the contrast between infections and parenchyma and find out the optimal boundaries; 3) manually remove trachea and blood vessels embedded inside these infections. This step is the most time-consuming and needs high-level knowledge; and 4) transfer the manual annotation to the other professional (in this case a radiologist). The other professional browses and fine-tunes the annotation generated by the first radiologist.

To overcome the lack of data bottleneck in deep learning applications, researchers have been using the idea of simulation, such as simulating Go games [20], simulating time-series fluorescence microscopy images, and simulating raw sequencing signals. This embodiment takes a similar approach, by introducing a model that simulates lung infections and their evolution in time. To generate a successful simulator, it is desired to capture and accurately quantify the underlying distribution that generates the real data. For the COVID-19 case, although the main goal focuses on the diagnosis and segmentation of the CT scans from early stage COVID-19 patients, the dataset does contain multiple CT scans taken at different time points during a patients disease course, from which it is possible to extract the statistics over time to build the simulation model.

Figure 4A:
Figure 4B:
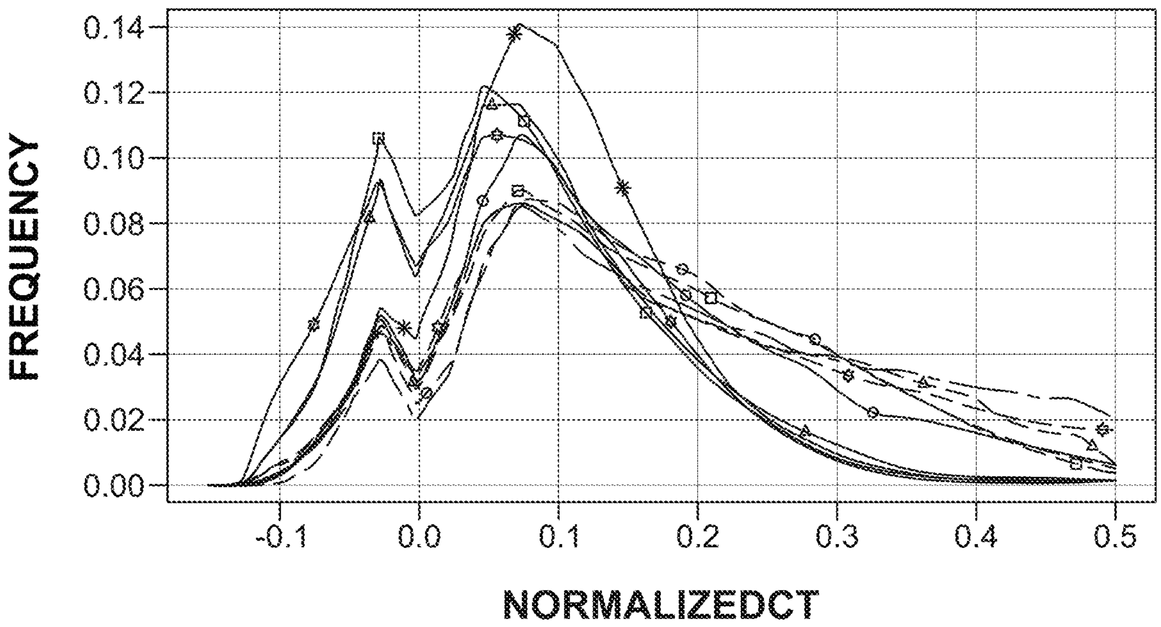
Figure 4D:
Figure 4E:
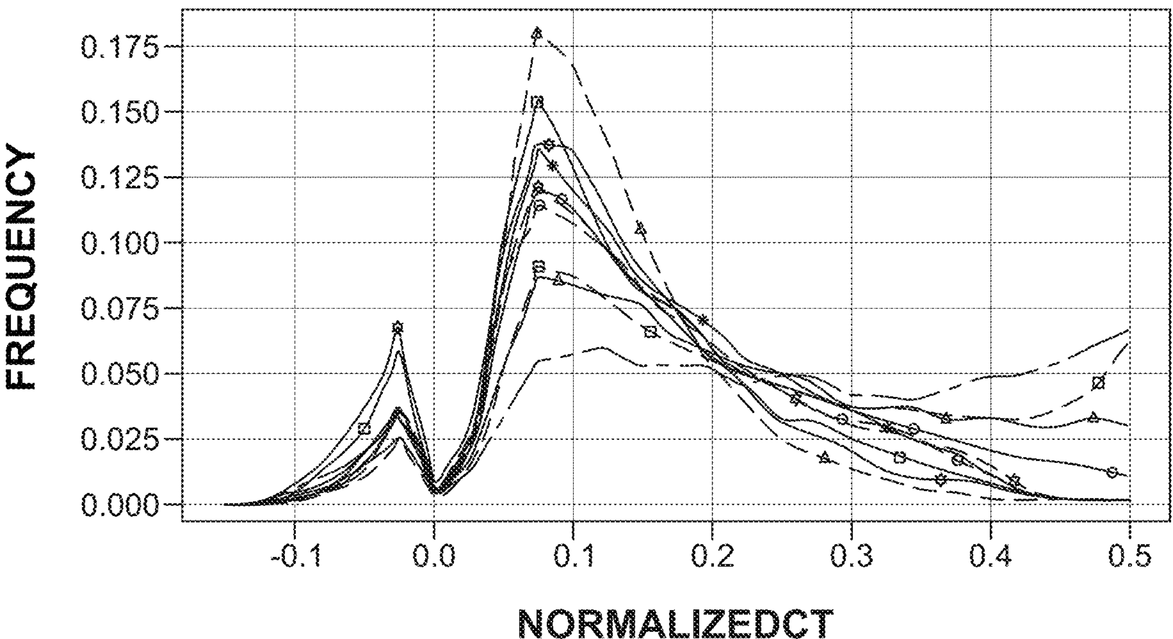

In this regard, FIGS. 4A to 4E illustrate the dynamic changes of the infections for a representative patient. FIGS. 4A and 4D give 3D visualization of how the lung infection progresses, and FIGS. 4B, 4C, and 4D plot out the distribution of the voxel intensities for the infection regions. Each line in FIGS. 4B, 4C, and 4E plots the frequency of the signal intensities of the voxels versus the position of the voxels.

To avoid the time consuming manual data augmentation performed traditionally by the existing algorithms, in this embodiment, the data augmentation is performed through modeling and simulating the dynamic changes of the infection, i.e., by using a model 132. The dynamic model 132 has four components: (1) how a new infection is generated; (2) how an old infection is absorbed; (3) how the normalized CT signals for infection voxels change in time; and (4) how the normalized CT signals for normal voxels change in time. This novel dynamic model is now discussed in more detail together with a description of how to fit the parameters for the model and how to conduct the data augmentation.

The dynamic model 132 for the infection regions is a Markov model, that has two components, a state $\Psi$ and a transition function T. The state $\Psi$ of the model is determined by the normalized data $\mathcal{S}=\mathbb{R}^{512\times512\times512}$, and the infection mask $\mathcal{M}\in\{0,1\}^{512\times512\times512}$, where the value "0" indicates no infection and the value "1" indicates infection. Thus, the state $\Psi$ is defined as:

$$\Psi=(\mathcal{S},\mathcal{M}). \tag{2}$$

Considering that the model 132 is applied a short period of time, the state $\Psi$ is selected to satisfy the Markov property, i.e., within 24 hours, each infection region evolved for 100 times. Based on these assumptions, the state $\Psi$ at time t is defined as $\Psi_t=(\mathcal{S}_t,\mathcal{M}_t)$ and the transition function T is defined as $\Psi_{t+1}=(\mathcal{S}_{t+1},\ \mathcal{M}_{t+1})=T(\Psi_t)=(T_{\mathcal{S}}(\mathcal{S}_t),T_{\mathcal{M}}(\mathcal{M}_t))$. It is noted that the transition function T is made of two functions, the normalized data transition function $T_{\mathcal{S}}$ and the infection mask transition function $T_{\mathcal{M}}$. The transition function T should be found so that during the evolution of the lung disease, the progression of the state $\Psi$, which will be the augmented data, conforms to the real data, i.e., the CT scans for different time points of the same patient.

After extensive observations and analysis on the available dataset, the inventors have discovered three trends. First, for a CT scan, although there can be many disconnected infection regions, the distribution of the normalized voxel intensity for each infection region is highly conserved, as illustrated in FIGS. 4B and 4E. Second, the frequency distributions for most infection regions have two clear peaks, around −0.025 and 0.1, and a clear valley around 0, as also shown in FIGS. 4B and 4E. Third, when the infections advance (e.g., from the early stage to the progressive stage, or from the progressive stage to the severe stage), the absolute number of voxels below 0 is much more stable than the rapid growth of the number of voxels above 0, as illustrated by FIGS. 4C(I) to 4C(III). Note that half of the curves in FIG. 4C are collected at a first date, and the other half of the curves were collected at a second date, later in time (10 days later in the figures).

Based on these trends, the inventors have simplified the dynamic model 132. More specifically, the first finding suggests that the dynamic model can be shared for all the infection regions. The second finding suggests that different evolution functions should be used to describe voxels with signals greater and less than 0. The third finding suggests that simple functions, like linear functions, can be used to describe the change of the absolute number of voxels below 0.

Based on these observations, the infection mask transition function $T_{\mathcal{M}}$ for the infection mask is determined first. The infection mask transition function $T_{\mathcal{M}}$ describes how the new infection voxels are generated and how the old infection voxels are absorbed. Two assumptions are made about $T_{\mathcal{M}}$, which were discussed with and confirmed by the front-line radiologists. The two assumptions are: 1) for the infection model: normal voxels nearby GGO are more likely to become GGO voxels during the transitions of the state Ψ. In addition, normal voxels like areas outside the lung, tracheae, blood tubes, etc., will never become a part of infection regions and for this reason, these voxels are called "invincible"; and 2) for the recovery model: when the signal intensity is smaller than −0.15, the voxel will become a normal voxel.

The infection mask transition function $T_{\mathcal{M}}$ is further split into two parts: the 'infection' part and the 'recovery' part. During a transition, the infection part of $T_{\mathcal{M}}$ is first applied, then the standard data transition function $T_{\mathcal{S}}$ is applied for all voxels, and the recovery part of $T_{\mathcal{M}}$ is applied last, as schematically illustrated by the following:

$$T = \textit{infection part of } T_{\mathcal{M}} \rightarrow T_{\mathcal{S}} \rightarrow \textit{recovery part for } T_{\mathcal{M}}.$$

The infection part of $T_{\mathcal{M}}$ has two dynamic parameters l and k. l is the probability for each infection voxel to infect its neighbors during each transition. In this embodiment, it is assumed that l is a constant for all infection voxels and for all time points t. The other dynamic parameter, k, controls the average distance of the generated infection voxels, and a larger k will generate more sparse infection voxels. k can be different for different types of infections, e.g., it is possible to require that GGO has a larger k than lung consolidations. An algorithm for the infection part of $T_{\mathcal{M}}$ can be schematically presented as having the following steps:

```
1. for each infection voxel:
2.    get a random value from Uniform(0,1) (which is a function that
generates a uniform distribution)
3.    if the random value is smaller than I:
4.       start from this voxel, do random walk on 3D grid for k steps,
         and stop at voxel des.
5.       if voxel des is not 'invincible':
6.          change voxel des to an 'infection' voxel
7.          change voxel des's normalized CT signal to max.
```

The recovery part of the $T_{\mathcal{M}}$ has no dynamic parameter. Considering that in the dataset used in this embodiment no infection voxel has a signal less than −0.15, the algorithm for the recovery part of the $T_{\mathcal{M}}$ is schematically presented as having the steps:

```
1. for each infection voxel:
2.    if its normalized CT signal is less than −0.15:
3.       change this voxel to a "normal" voxel (i.e., a non-infected voxel)
```

The standard data transition function $T_{\mathcal{S}}$, which describes how the signals change during the transition, is now discussed. There are four assumptions about the standard data transition function $T_{\mathcal{S}}$ follows:

1) Invariance for normal voxels: the signal intensities for normal voxels are invariant during the transition.
2) Absorption: the inflammatory infiltration is measured by the CT signal and the human body absorbs the inflammatory infiltration at a constant speed.
3) Consolidation and fibration: when the CT signal increases, the voxel gradually consolidates, which means its signal becomes more difficult to further increase.
4) Threshold value 0: when the intensity of a GGO voxel reaches 0, its signal will not further increase. It has a probability to convert into the next stage and pass across value 0.

To simulate the clear gap of the frequency distribution around 0 shown in FIG. 4C(I) to 4C(III), the standard data transition function $T_{\mathcal{S}}$ is divided into three parts: $T_{\mathcal{S}}^{<0}$, $T_{\mathcal{S}}^{=0}$, and $T_{\mathcal{S}}^{>0}$, and it is assumed that the body absorbs the infection infiltration at a constant speed A. With these assumptions, the algorithm for the standard data transition function $T_{\mathcal{S}}$ is schematically presented as having the steps:

1. for each infection voxel:
2. if its signal is less than −0.0125:
3. apply $T_{\mathcal{S}}^{<0}$ on this voxel;
4. if its signal is in the interval [−0.0125, 0.0125):
5. apply $T_{\mathcal{S}}^{=0}$ on this voxel;
6. if its signal is not less than 0.0125:
7. apply $T_{\mathcal{S}}^{>0}$ on this voxel;
8. decrease its signal value by A.

In the following, the normalized CT signal of a voxel is denoted by s. Then, $T_{\mathcal{S}}^{<0}$ has two dynamic parameters: a, b. A larger a means that $T_{\mathcal{S}}^{<0}$ is more influenced by s, while a larger b means that s is more likely to increase during the transition. Thus, the algorithm for $T_{\mathcal{S}}^{<0}$ is:

1. get a random value from Uniform(0,1)
2. If the random value is less than exp(as+b):
3. increase s by Uniform(0, 0.025).

$T_{\mathcal{S}}^{=0}$ has one dynamic parameter p. A larger p means s is more likely to increase during the transition. Thus, the algorithm for $T_{\mathcal{S}}^{=0}$ is:

1. get a random value from Uniform(0,1)
2. If the random value is less than p:
3. increase s by Uniform(0, 0.025).

$T_{\mathcal{S}}^{>0}$ has three dynamic parameters: c, d, and e. A larger c means $T_{\mathcal{S}}^{>0}$ is more determined by s, while a larger d means s is more likely to increase during the transition. Parameter e is a parameter that controls the difficulty of a consolidated infection to further infiltrate. The algorithms for $T_{\mathcal{S}}^{>0}$ is:

1. get a random value from Uniform(0, 1);
2. If the random value is less than $\exp(cs+d)/s^e$:
3. increase s by Uniform(0, 0.025).

The dynamic model 132 discussed above has at least one of the following two advantages. First, it can generate infection regions that comply with the signal intensity distribution of the real data for COVID-19. Second, it can generate infection regions that follow the morphology and spatial distribution of the real data, with user-controllable parameters. For example, it is possible to require the GGO lesions to be more widespread, while the pulmonary consolidations to be relatively clustered.

The eight independent parameters introduced above for the transition function Tare denoted by W=(a, b, c, d, e, l, k, p), and thus, the transition function can be written as T=T(W). Next, it is necessary to fit the parameters W of the dynamic model 132 to the existing real time series of CT scan data. For this step, there is a starting state $\Psi_{t_i}$ and an ending state $\Psi_{t_j}$ that are used to fit the dynamic parameters W. The initial state $\Psi_{t_i}$ requires $t_j-t_i$ transitions to become $\Psi_{t_j}$. Thus, by applying the transition function T(W) to $\Psi_{t_i}$ for $t_j-t_i$ times, a simulated state $\hat{\Psi}_{t_j}$ is obtained. The difference between the signal intensity distribution (denoted as $\hat{F}_{t_j}$) of the simulated state $\hat{\Psi}_{t_j}$ and the signal intensity distribution (denoted as $F_{t_j}$) of the actual final state $\Psi_{t_j}$ is used as a loss function to optimize the parameters W, as follows:

$$L(W) = \int (\hat{F}_{t_j} - F_{t_j})^2 dx, \tag{3}$$

where x is the signal intensity.

There are very fast algorithms to calculate L(W) without explicitly calculating $\hat{\Psi}_{t_j}$, for example, the gradient descent. Explicitly calculating $\hat{\Psi}_{t_j}$ is time consuming, i.e., if explicitly calculating $\hat{\Psi}_{t_j}$, each gradient descent step may take several minutes, which is too slow. Thus, in one embodiment, the process does not explicitly calculate $\hat{\Psi}_{t_j}$ to get $\hat{F}_{t_j}$, instead, the process approximates $\hat{F}_{t_j}$.

In one application, the transfer function T is simplified by a) considering all "invincible" voxels as "normal" voxels, and b) by deleting the parameter k, i.e., during the infection, randomly pick a normal voxel to infect. The simplified transition function is denoted as T*. T* has dynamic parameters W*=(a, b, c, d, e, l, p). With conditions a) and b), all spatial correlations of the voxels in the state Ψ are eliminated. Thus, the simplified transfer function r is considered as a voxel-wise signal change function. That is, if a voxel initially has signal so, it is possible to directly compute the value $s_N$ without knowing signal values of other voxels. Thus, it is possible to compute $F_{t_j+1}$ based on $F_{t_j}$.

For example, if the frequency distribution F records signals within the range of [−0.15, 0.5] and the frequency is computed with the bin size of 0.025, then F has n=26 bins. Thus, F is an array with shape: F=F[26]. Denoting $F_{t*}$ as the distribution of $\Psi_{t*}$, which has undergone t* times the transition T*, the algorithm for calculating $F_{t*+1}$ based on $F_{t*}$ is given by:

1. input the array: $F_{t*}=F_{t*}[26]$
2. initialize a zero array: increase=increase[26]
3. for sec in range(0,n):
4. $F_{t*}$[sec]-=the proportion of voxels of $F_{t*}$[sec] transferred into adjacent sections;
5. increase[adjacent of sec]+=proportion of received voxels of F[sec] adjacent sections;
6. $F_{t*}$[:]+=increase[:]
7. return $F_{t*}$ as $F_{t*+1}$.

With this algorithm, it is possible to approximate $\hat{F}_{t_j}$ from $F_{t_i}$ with $t_j-t_i$ times of T*. Note that in the transition function T, there are "invincible" voxels. Thus, T* generates more infections when the infection parameter l is the same, i.e., there are systematic bias for parameter l. After running a precise calculation of F to understand this bias, the inventors found that l fitted by T* needs to multiply by 1.26.

Parameter k could not be fitted from equation (3). However, it is possible to set k to different values to control the sparsity of different types of infections. In practice, it is possible to set W*=(4, −2, −10, −1.6, 1.2, 0.01, 0.02) as the initial values, and set k to 5 for voxels with signal s<0 and to 2 for voxels with signal s>0. FIG. 4C(I) to 4C(III) provide examples of the change of the signal intensity distributions over time.

Next, the data augmentation through the simulation step is discussed. In the used dataset, each patient has a scan from an early stage. It is assumed that three days before the earliest scan (denoted as time $t_0=0$), there is little infection in the patient. Thus, the series of scans and masks for a patient are denoted as:

$$\Psi_{t_0}, \Psi_{t_1}, \Psi_{t_2}, \ldots, \Psi_{t_N}. \tag{4}$$

For the state $\Psi_{t_0}$, the standard resolution $\mathcal{S}_{t_0}$ is obtained by setting all the infection voxels of the earliest scan $\mathcal{S}_{t_1}$ to −0.15 and the mask $\mathcal{M}_{t_0}$ is obtained by randomly selecting 10% of the infection voxels of $\mathcal{M}_{t_1}$. Because the model assumes 100 transitions per 24 hours of time, and assumes that the first CT scan happens 3 days after the state $\Psi_{t_0}$, it results that $t_1=300$.

During data augmentation, the parameter $W_i$ for each pair of adjacent time states $\Psi_{t_i-1}$, and $\Psi_{t_i}$, where 1≤i≤N, is fit to the actual data, and by applying the transfer function $T(W_i)$ on the states $\Psi_{t_i}$ for 200 transitions, the model simulates CT scans for 200 time points. Then, in this embodiment, the augmented data is obtained by randomly selecting 1% of the simulated scans. Thus, the training samples are augmented by 200% through dynamic simulation using the model 132.

It is worth noting that this data augmentation procedure can be considered as an 'interpolation' method for CT scan time-series. However, instead of interpolating the morphologies of the infection regions, the model 132 interpolates the infection volume and the signal distribution of the infected voxels. The inventors found that this method achieved the best performance at an augmentation ratio of 200%, as discussed later.

The segmentation process 106, which was schematically illustrated in FIG. 1, is now discussed in more detail. A CT scan 110 is represented as a 3D tensor, for which the most intuitive idea would be to directly apply 3D deep learning models, such as 3D CNN and 3D U-Net. However, such 3D models are known to have various issues [22], including large number of parameters, slow convergence rates, and high requirements on memory. There have been efforts on decomposing the 3D segmentation problem into a series of 2D ones by taking slices along the z-axis (the direction of the body), but such strategy often has unsatisfactory performance due to the loss of information.

In this embodiment, the 3D segmentation problem is decomposed into three 2D ones, along the x-y, y-z, and x-z planes, respectively. This approach is based on two facts. First, during the manual annotation along the x-y planes, when radiologists feel ambiguous about a voxel, they usually refer to images along the y-z and x-z planes to make the final decision. Thus, several 2D images from these three planes contain essential information about whether a voxel is an infection or not. Second, the normal tissues, such as lung lobes, pulmonary arteries, veins, and capillaries, have much more regular morphologies than the infection regions.

Their morphologies are more or less conserved among different patients, whereas patients' infection regions can be completely different from each other. If a model only looks in one direction, for example, the cross-section x-y plane, then arteries or veins can be difficult to be differentiated from the infection regions, whereas if looking at the x-z or y-z planes, they can be easily differentiated.

Thus, the segmentation procedure 106 uses a three-way segmentation model as now discussed. Any lung CT scan 110 is cast into the standard resolution $\mathcal{S}=\mathbb{R}^{512\times512\times512}$. For every voxel $s$ that belongs to $\mathcal{S}$, there are three images: a first image 118-1, $\mathcal{P}_{xy}^{s}$, from the x-y plane, a second image 118-2, $\mathcal{P}_{yz}^{s}$, from the y-z plane, and a third image, $\mathcal{P}_{xz}^{s}$, from the x-z plane, so that $s=\mathcal{P}_{xy}^{s}\cap\mathcal{P}_{yz}^{s}\cap\mathcal{P}_{xz}^{s}$. Note that the three images 118-1 to 118-3 are 2D images corresponding to a given voxel, and the three 2D images 118-1 to 118-3 are obtained from the normalized data 112. Thus, the semantic of $s$ can be considered as:

$$p^{s}=\mathcal{g}(\mathcal{P}_{xy}^{s},\mathcal{P}_{yz}^{s},\mathcal{P}_{xz}^{s}), \tag{5}$$

where $p^{s}$ is the probability of voxel $s$ to be an infection point, and $\mathcal{g}$ is the function to determine the voxel semantic from three orthogonal views. However, directly training the model 132 based on equation (5) is very time-consuming. Thus, according to this embodiment, the following approximation is used for equation (5), $$\hat{p}^{s}=g(\hat{p}_{xy}^{s},\hat{p}_{yz}^{s},\hat{p}_{xz}^{s})=g(f_{xy}^{s}(\mathcal{P}_{xy}^{s}),f_{yz}^{s}(\mathcal{P}_{yz}^{s}),f_{xz}^{s}(\mathcal{P}_{xz}^{s})). \tag{6}$$

Equation (6) represents the three-way model architecture illustrated in FIG. 1 by functions 120-1 to 120-3. Here $\hat{p}^{s}$ is the predicted probability of the voxel $s$ to be an infection voxel, and it is a real value, and $f_{xy}^{s}$, $f_{yz}^{s}$, and $f_{xz}^{s}$ are three intermediate models 120-1 to 120-3, and the inputs of these three models are information from the x-y, y-z and x-z planes, respectively. Then, the intermediate models 120-1 to 120-3 output their predictions for the semantic of $s$, and their outputs are denoted as $\hat{p}_{xy}^{s}$, $\hat{p}_{yz}^{s}$, and $\hat{p}_{xz}^{s}$, which are three real values. The function g is the aggregation function for combining the values $\hat{p}_{xy}^{s}$, $\hat{p}_{yz}^{s}$, and $\hat{p}_{xz}^{s}$, to obtain the final prediction $\hat{p}^{s}$. The training in the data augmentation module 130 of the model 132 has two stages: (1) training the intermediate models $f_{xy}^{s}$, $f_{yz}^{s}$, and $f_{xz}^{s}$ to calculate the values $\hat{p}_{xy}^{s}$, $\hat{p}_{yz}^{s}$, and $\hat{p}_{xz}^{s}$ for every voxel $s\in\mathcal{S}$, and (2) determining a reasonable function g for the final prediction.

With regard to the intermediate models $f_{xy}^{s}$, $f_{yz}^{s}$, and $f_{xz}^{s}$, this embodiment assumes that $\mathcal{P}_{xy}\in\mathbb{R}^{512\times512}$ is an image from an x-y plane of $\mathcal{S}$ and assume a 2D segmentation model $f_{xy}$ that can segment infection pixels for any image from the x-y plane. Thus, the output of $f_{xy}(\mathcal{P}_{xy})\in\mathbb{R}^{512\times512}$ is the probability map of infections, which is the 2D array for $\hat{p}_{xy}^{s}$, with $s\in\mathcal{P}_{xy}$. There are 512 different images along the x-y direction, so computing 512 times of $f_{xy}$ will get $\hat{p}_{xy}^{s}$, $s\in\mathcal{S}$. Similarly, there is a 2D segmentation model $f_{yz}$ for images from the y-z direction, and $f_{zx}$ for images from the x-z direction. By computing these three models, the values $\hat{p}_{xy}^{s}$, $\hat{p}_{yz}^{s}$, and $\hat{p}_{xz}^{s}$ for every voxel $s\in\mathcal{S}$ is obtained.

The inventors have tried many 2D segmentation architectures including U-Net, Mask R-CNN, etc. The inventors have also tried to make the models $f_{xy}^{s}$, $f_{yz}^{s}$, and $f_{xz}^{s}$ share some parameters. The experiments show that three independent U-nets functions have the fastest training time and perform the best. Thus, the intermediate models 120-1 to 120-3 in this embodiment are selected to be three independent 2D U-nets functions.

The inventors have also tried to further improve the intermediate models. For this goal, although the radiologists believe that by combining $\hat{p}_{xy}^{s}$, $\hat{p}_{yz}^{s}$, and $\hat{p}_{xz}^{s}$ it is possible to determine whether a voxel is infected or not, the inventors believe that to understand more detailed semantics, like whether the infection is caused by H1N1 or COVID-19, the model has to know more information from the adjacent images. Thus, according to this embodiment, at least four extra images, which are the ones of −5, −2, +2 and +5 millimeters away from the voxel, are also considered when determining the infection probability of each voxel. Because the resolution of the standard embedding space is 334 mm for the x- and y-axes, and 1.00 mm for the z-axis, images that are −5, −2, 0, +2, +5 millimeters away from the image containing the voxel (denoted as the i-th image) are the images i−8, i−3, i, i+3, i+8 along the x- or y-axis, and i−5, i−2, i, i+2, i+5 along the z-axis. The inventors have also tried other combinations of this parameter and the performance is inferior to the combination of −5, −2, 0, +2, +5. This approach is conceptually similar to dilated convolution, which aggregates information from the adjacent slices to effectively improve the performance of the current slice.

Thus, based on experiments and clinical practice, the intermediate models $f_{xy}$, $f_{yz}$, and $f_{xz}$ are three independent U-nets functions, which input five adjacent images (input dimension: $\mathbb{R}^{512\times512}$), and output the infection probability map for the central image (output dimension: $\mathbb{R}^{512\times512}$).

The last part of the model 132 is the aggregation function g. After the intermediate predictions $\hat{p}_{xy}^{s}$, $\hat{p}_{yz}^{s}$, and $\hat{p}_{xz}^{s}$ for every voxel $s\in\mathcal{S}$ are calculated, there are various ways to aggregate them together (1) linear combination with fixed or learnable weights, then taking a threshold; (2) multiplying them together; (3) using SVM with these three values as features, etc. After trying various choices, the inventors found that the best performing g is a binary function, which sums up the intermediate predictions and then takes a threshold of 2, i.e., $g(\hat{p}_{xy}^{s},\hat{p}_{yz}^{s},\hat{p}_{xz}^{s})=(\hat{p}_{xy}^{s}+\hat{p}_{yz}^{s}+\hat{p}_{xz}^{s})>2$. This implies that the normal tissues look different from infections in at least one plane.

A machine-agnostic segmentation and quantification method for coronavirus diagnostic, based on the various processes, functions, and models discussed above is now discussed with regard to FIG. 5. The method includes a step 500 of receiving computer tomograph, CT, raw scans 110, a step 502 of normalizing the CT raw scans 110 to obtain normalized data 112, wherein the normalized data 112 is normalized in terms of dimension, resolution, and signal intensity, a step 504 of generating augmented data 134 based on (1) the CT raw scans 110 and (2) a simulation model 132, a step 506 of segmenting three different 2-dimensional, 2D, images 118-1 to 118-3, from the normalized data 112, which correspond to a same voxel, $s$, using three functions $f_{xy}^{s}$, $f_{yz}^{s}$, and $f_{xz}^{s}$, respectively, and a step 508 of quantizing each voxel $s$ to have a value of 0 or 1, based on the three functions $f_{xy}^{s}$, $f_{yz}^{s}$, and $f_{xz}^{s}$ and an aggregation function g. The value 0 indicates that the voxel is not infected with the coronavirus, and the value 1 indicates that the voxel is infected with the coronavirus and the three functions $f_{xy}^{s}$, $f_{yz'}^{s}$, and $f_{xz}^{s}$ are trained based on the augmented data 134.

In one application, the step of normalization is performed for each voxel. The step of normalization may simultaneously normalize the dimension, resolution and signal intensity. The simulation model uses a state Ψ and a Markov property. In one application, the state Ψ includes a normalized data part and an infection mask part. The method further includes a step of applying a transition function T to the state Ψ to calculate the augmented data, and/or fitting plural parameters W of the simulation model on the CT raw scans. The step of segmenting further includes inputting to each of the three functions $f_{xy}^{s}$, $f_{yz'}^{s}$, and $f_{xz'}^{s}$, in addition to the corresponding 2D image of the same voxel, at least four extra images which are not part of the voxel. In one application, the at least four extra images are −5, −2, 2, and 5 mm away from the voxel. In one application, each of the three functions $f_{xy}^{s}$, $f_{yz}^{s}$, and $f_{xz}^{s}$ is a U-net function. The step of quantization may also include summing up outputs of the three functions $f_{xy}^{s}$, $f_{yz'}^{s}$, and $f_{xz}^{s}$, and applying a threshold of 2 to the summed up outputs to generate the value of 0 or 1.

The models and processes and methods discussed above may be implemented in a computing device as illustrated in FIG. 6. Hardware, firmware, software or a combination thereof may be used to perform the various steps and operations described herein. Computing device 600 suitable for performing the activities described in the exemplary embodiments may include a server 601. Such a server 601 may include a central processor (CPU) 602 coupled to a random access memory (RAM) 604 and to a read-only memory (ROM) 606 for hosting any of the models discussed above. ROM 606 may also be other types of storage media to store programs, such as programmable ROM (PROM), erasable PROM (EPROM), etc. Processor 602 may communicate with other internal and external components through input/output (I/O) circuitry 608 and bussing 610 to provide control signals and the like for obtaining CT scan raw data. Processor 602 carries out a variety of functions as are known in the art, as dictated by software and/or firmware instructions.

Server 601 may also include one or more data storage devices, including hard drives 612, CD-ROM drives 614 and other hardware capable of reading and/or storing information, such as DVD, etc. In one embodiment, software for carrying out the above-discussed steps may be stored and distributed on a CD-ROM or DVD 616, a USB storage device 618 or other form of media capable of portably storing information. These storage media may be inserted into, and read by, devices such as CD-ROM drive 614, disk drive 612, etc. Server 601 may be coupled to a display 620, which may be any type of known display or presentation screen, such as LCD, plasma display, cathode ray tube (CRT), etc. A user input interface 622 is provided, including one or more user interface mechanisms such as a mouse, keyboard, microphone, touchpad, touch screen, voice-recognition system, etc.

Server 601 may be coupled to other devices, such as various imagining devices, e.g., a CT scanner. The server may be part of a larger network configuration as in a global area network (GAN) such as the Internet 628, which allows ultimate connection to various landline and/or mobile computing devices.

The performance of the method discussed above is now evaluated. To evaluate the segmentation performance, the dice, recall, and the worst-case dice performance are used herein. Dice, or dice similarity coefficient (DSC), and recall are defined as:

$$\text{Dice} = \frac{2|Y \cap Y'|}{|Y| + |Y'|}, \text{ and} \tag{7}$$

$$\text{Recall} = \frac{|Y \cap Y'|}{|Y|}, \tag{8}$$

where Y is the ground-truth infection region annotated by the radiologists, Y' is the predicted infection region by the method, and |Y| denotes the cardinality of the set Y. Both the Y and Y' are binary tensors. It is known that for binary classifiers, the dice is the same as the F1-score. For COVID-19 diagnosis, the recall is an important measurement because missing detection can cause fatal consequences of the patient and pose a large threat to the community. The worst-case performance was also used to indicate a method's ability to generalize reliable prediction even in the worst-case scenario.

To evaluate the quantification performance, the root mean square error (RMSE) and the Pearson correlation coefficient (PCC) were used, which are defined as:

$$PCC = \frac{\text{cov}(Z, Z')}{\sigma_Z \sigma_{Z'}}, \text{ and} \tag{9}$$

$$RMSE = \sqrt{\frac{\sum_{i=1}^{N} (z_i - z_i')^2}{N}}, \tag{10}$$

where N is the number of CT scans, $z_i$ is the ground-truth percentage of the infection volume to the lung volume of the i-th scan, $z'_i$ is the predicted percentage of the infection volume to the lung volume of the i-th scan, Z is the ground-truth percentage of all the scans, Z' is the predicted percentage of all the scans, cov(Z, Z') is the covariance between Z and Z', and $\sigma_Z$ is the standard deviation of Z. Also, this section compares the training and testing runtime and memory cost of the different methods to assess their usefulness in meeting the needs of rapid diagnoses of COVID-19. The results are structured based on the various features that they are testing.

The data and imagining protocol used for these tests is now discussed. The inventors collected 201 anonymized CT scans from 140 COVID-19 patients from 4 different hospitals, scanned by 6 different CT scanners (hereinafter referred to as the Harbin dataset). In addition, to validate the method on a third-party dataset, the inventors collected 20 anonymized CT scans from 20 COVID-19 patients, scanned by 2 different CT scanners (hereinafter referred to as the Riyadh dataset). Since the method focused on early stage patients, each data was checked to ensure that each patient has at least one CT scan from an early stage. The Harbin and Riyadh datasets are collectively referred to herein as the “current dataset.”

All the patients were confirmed to be COVID-19 positive by either the nucleic acid test or antibody test. The CT imaging protocols are shown in the table in FIG. 7. They represent a wide range of data varieties: the number of CT scans per patient ranges from 1 to 5; the age of the patients ranges from 19 to 87; the number of images per CT scan ranges from 245 to 408; the slice thickness after reconstruction ranges from 1 mm to 5 mm; the window width ranges from 1200 HU to 1600 HU; and the window level ranges from −600 HU to −400 HU.

The Harbin dataset was carefully segmented at a voxel-level. Since the infection areas often have a higher density than the remaining parts of the lung, lung tissues with high density were manually checked and removed from the segmented infection areas, such as pulmonary arteries, pulmonary veins, and pulmonary capillaries. The Riyadh dataset was not segmented by radiologists at a pixel level, but rather at the region of interest (ROI)-level, denoted by circles. Therefore, the Harbin dataset was used for both quantitative and qualitative evaluation, whereas the Riyadh dataset was used for qualitative evaluation.

For quantitative evaluation, the inventors conducted a 5-fold cross-validation (CV) over the Harbin dataset at the patient level, i.e., all the patients were randomly split into five folds, and each time, four folds were used for training and validation, and the remaining fold was used for testing. If a patient was selected in a set, all of its CT scans were included in that set. All the compared methods were trained and tested on the same five-fold split to guarantee a fair comparison. To mimic the real-world application, the average scan-level performance was reported, instead of the patient-level one.

Because the dataset came from a variety of sources, as illustrated in FIG. 7, the same spatial and signal normalization were applied to the raw data before applying any compared method. After normalization, each scan was cast into the dimension of $\mathbb{R}^{512\times512\times512}$ and the resolution of $$\frac{334}{512}\times\frac{334}{512}\times 1\ \text{mm}^3$$

for each voxel, and the signal intensity within the lung window was cast into the range of [−0.5,0.5], as discussed above with regard to the normalization method.

The data augmentation process was applied with different ratios over the Harbin dataset. That is, for each CT scan in the dataset, different numbers of scans were simulated as being the augmented data.

During the evaluation step, the augmentation ratio was fixed to 200% (i.e., for each actual CT scan, two scans were simulated), and trained all the compared methods on the same augmented datasets. The 200% augmentation ratio was chosen for two reasons: 1) the majority of the compared methods obtained peak performance at this ratio, while the ones that did not (e.g., 3D U-net and 3D V-net) only had a small difference in performance between this ratio and the optimal one; and 2) by fixing the augmentation ratio, the different segmentation models were fairly evaluated.

Next, the detailed effects of data augmentation over the different methods were evaluated. To this end, the data was augmented by 0%, 50%, 100%, 200%, 300% and 400%, where 50% means that for each CT scan, one scan was simulated and gave it 50% probability to be included in the training dataset. A comprehensive evaluation of the effect of the data augmentation strategy over the different methods was obtained in this way.

Figure 5:
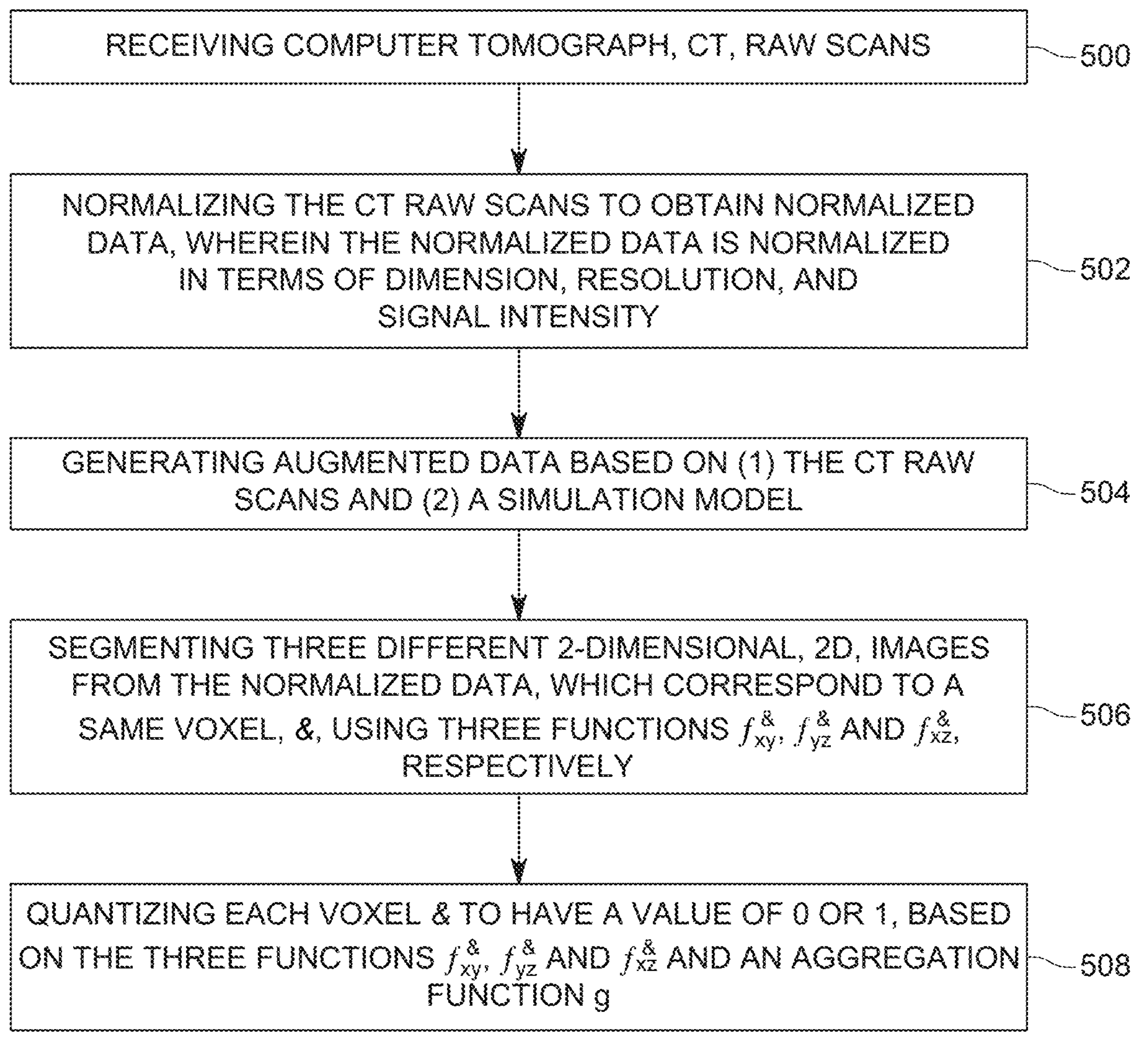
FIG. 5 is a flow chart of a machine-agnostic segmentation and quantification method for coronavirus diagnostic.

The method illustrated in FIG. 5, called herein the "current method," was compared with the baseline 2D segmentation method (i.e., 2D U-net over the x-y planes), the state-of-the-art 2.5D segmentation methods (i.e., MPUnet [24] and H-DenseUNet [22] (hereinafter referred to as H-DUnet)), the classical 3D method (i.e., 3D U-net [25]), as well as the backbone model of the available state-of-the-art segmentation method for COVID-19 (i.e., 3D V-net [19], [26]). Since the method in [19] is based on human-in-the-loop strategy, the present implementation just tests its backbone 3D model, but cannot represent the actual performance of that method.

During the implementation of the 3D models, since the direct implementation consumes a large amount of memory that none of the GPUs available to the inventors can accommodate, the inventors divided the 512×512×512 preprocessed CT scans into many sub-volumes shaped as 128×128×128 and fed each of them into the network independently. This is a common practice in 3D image processing, which does not affect the performance of the 3D segmentation much, because most of the information for segmentation is well maintained in the sub-volume.

It is worth noting that for the current method, the user had two outputs: 1) the binary prediction where 1 stands for infection and 0 stands for normal, and 2) the real-valued prediction, which represents the probability of the voxel being an infection. There are two reasons for this. First, through the discussion with the front-line radiologists, they felt that a tunable threshold to discretize such probability to binary prediction is practically useful for the clinical applications. Second, due to the high heterogeneity of the used dataset, the large number of possible morphologies of the infections, and the limited samples for COVID-19, the optimal threshold to convert the probability into the binary prediction over the training set may not be the same as the optimal one over the validation set (i.e., the four folds were split into training and validation for each iteration of the 5-fold CV). The same logic is applicable to all the compared methods as they can also output both real-valued (e.g., the output from the softmax layer) and discrete predictions. Therefore, the threshold for all the compared methods was further tuned over the same validation sets and selected the optimal threshold for each of them. All the evaluations were then done based on the discretized binary predictions after applying the corresponding thresholds.

The segmentation performance of all these methods is now discussed. The segmentation performance of the current method was evaluated first. As shown in the table in FIG. 8, the current method has a significantly higher dice than all the compared methods, improving the second-best method (3D V-net) by about 0.14, which demonstrates its superior performance on the voxel-level classification of the infection. The current method is able to identify most of the infection regions, demonstrated by a recall of 0.776, which is slightly lower than that of H-DUnet (0.802). However, the H-DUnet method achieved this recall at the cost of a large number of false positives. In addition, the current method is not only accurate, but also robust: the worst-case performance in terms of dice is 0.557, whereas the H-DUnet method failed on 3 cases (dice below 0.2) and other methods failed on even more cases. The MPUnet method seems quite unstable and failed on many cases, which conforms to their reported performance and high variance on large-scene-small-object tasks such as tumor segmentations.

The results in the table in FIG. 8 suggest that the current 2.5D model 106 significantly outperforms other 2.5D models (i.e., MPUnet and H-DUnet), which seems to be counter-intuitive as the three-way model is conceptually simpler than the compared 2.5D models. There are two main reasons for this. 1) The number of parameters of other 2.5D models is more than five times higher than that of the current model 106. The majority of applications of 2.5D models in image segmentation focus on the small-scene-large-object scenario. However, the CT scan segmentation for COVID-19, especially for early-stage scans, is a typical large-scene-small-object problem with limited data, thus models with an overwhelming amount of parameters cannot learn effectively. 2) The data used in this application contain CT scans from different machines with different protocols. In fact, 2D U-net, H-DUnet, MPUnet, 3D U-net and 3D V-net failed in segmenting the infection regions on 13, 3, 31, 12, and 8 cases, respectively, which badly influenced their overall performance. A detailed inspection reveals that these failed cases are mostly scans with artifacts or have tiny infection regions. If such cases are not counted, the existing methods can achieve much better performance (see the second block in the table in FIG. 8).

To further validate these results, the inventors repeated the experiments on the highest-quality and less-variant subset of the Harbin dataset, which was collected from the same CT machine of the same hospital (i.e., CT scanner ID '1' from hospital ID 'A' in the table in FIG. 7). The subset contains CT scans of 50 patients taken by a 256-slice Brilliance iCT, Philips, and has the highest signal-to-noise ratio in the dataset, which was visually confirmed by radiologists. A 5-fold cross-validation was conducted, as shown in the third block of the table in FIG. 8. Comparing to the performance over the entire dataset (first block in the table in FIG. 8), the performance of the current method is stable and robust, whereas the other methods have clear improvement in terms of both dice and recall.

The reported performance of the segmentation methods in FIG. 8 might seem to be inconsistent with some recent studies, such as [19]. There are three possible reasons for this. First, the current dataset contains a mixture of different stage scans, the majority of which are early-stage ones (73%). In general, the early-stage segmentation is much more challenging than the progressive- and the severe-stage segmentation because of the scattered and small infection regions, no clear boundaries for many infection regions, and the high variance in the infection volumes (e.g., the infection region volume of one early-stage scan can be more than 500 times bigger than that of another early-stage scan). Second, the ground-truth of the current dataset is based on very detailed manual segmentation that excludes tracheae and blood-vessels inside infections, which makes voxel-level dice a highly stringent evaluation metric. To validate this, the inventors used a less stringent evaluation criterion. That is, as long as a predicted infection point is within 2 pixels from a true infection point, it is counted as a true positive. This criterion will make the prediction task much easier, especially for the early-stage patients. Using this criterion for evaluation, the average dice of the existing methods improved by at least 0.2, whereas that of the current method improved by only about 0.12 (see the fourth block vs. first block in the table of FIG. 8). This suggests that the current method is capable of predicting scattered and tiny infection regions, which is critical to segment infections from the early-stage patients. Third, a very recent publication reported the average dice for different segmentation models to be around 0.55, which is consistent with the current reported values and demonstrates that the absolute dice values highly depend on the datasets, and thus the relative comparison among different methods is more important.

A more detailed analysis on the different methods' performance was then conducted over the early-, progressive- and severe-stages. As shown in the table of FIG. 9, the existing methods performed reasonably well on the progressive- and severe-stages. On the most difficult stage, the early-stage, the current method outperformed the existing methods by a larger margin, i.e., more than 0.18 increase in dice comparing to the second-best method, 3D V-net. This illustrates the power of the current method in segmenting early-stage patients. When the segmentation results for the different methods was compared, it was found that the current method consistently performed well on these examples, whereas the compared methods sometimes under-segmented and sometimes over-segmented the infection regions. For a second example, the current method can correctly segment the majority of the large infection regions while distinguishing arteries and tracheae embedded in the regions. Interestingly, for a first example, the current method also distinguished one possible trachea in the infection region, whereas the manual annotations considered that as the infection. After consulting experienced radiologists, that region is indeed a trachea.

The quantification performance of the current method 5 was tested versus the traditional methods by comparing the RMSE and Pearson correlation coefficient between the actual percentage of infection volume to the lung volume, and the percentage of the predicted infection volume to the lung volume. This percentage has been shown to provide critical information for the treatment and prognosis of COVID-19 patients.

The table in FIG. 10 shows that the current method provides highly accurate quantification to the infection volume, with an average error rate of only 2.5%, which is much lower than the second best method. The worst-case error rate of the current method is 4.9%, whereas the worst-case error rate of the other methods is at least 16% and can be as high as 31%. This significant outperformance is due to the accurate segmentation of the segmentation model and its ability to correctly distinguish lung tissues such as arteries and veins from infection regions.

For the augmentation analysis, the inventors applied different augmentation ratios on the training data and reported the performance of all the compared methods in the table in FIG. 11. It is clear that all the 2D, 2.5D and 3D methods can significantly benefit from data augmentation, which suggests the potential of the current data augmentation approach being a general strategy to boost the state-of-the-art segmentation methods for COVID-19.

The inventors observed that different methods achieved the peak performance at different augmentation ratios. In general, the 2D and 2.5D methods tend to benefit more from a higher augmentation ratio (e.g., 200%) than the 3D methods (e.g., 100%), although the difference for ratios above 100% seems to be small. This is so because the 2D and 2.5D models take less information as inputs than the 3D models, thus it is highly challenging for them to distinguish lung lobes, pulmonary arteries, veins, capillaries and artifacts. Data augmentation can greatly help and reinforce them in correctly eliminating such false positive predictions. On the other hand, the current data augmentation approach does not create information, but rather interpolates the infection volumes and distributions, while estimating the morphologies for new infections. Thus, an overly high augmentation ratio will not further boost the performance of the method.

The current method 5 has also improved the runtime of the computing device 600, when compared with the existing methods. In this regard, the inventors have compared the time and memory consumptions of the different methods, and as show in the table in FIG. 12, the current method cost less than 6 hours to train on 4 GPU cards of GeForce GTX 1080, which is much lower than the other 2.5D methods and 3D methods. A similar conclusion can be drawn in terms of the prediction time. The prediction time of the current method is even comparable to that of the 2D method, which, again, confirms that the current segmentation model provides a good tradeoff between time and accuracy. These above discussed results demonstrate the efficacy of the segmentation model 120, i.e., decomposing the 3D segmentation problem into three 2D ones.

Based on the results obtained herein, the procedure 100 discussed in the previous embodiments and schematically illustrated in FIG. 1 is more efficient than most of the existing methods, improves the diagnostic of COVID-19, and also improves the performance of the computing device that runs the procedure. The procedure 100 includes a preprocessing method to cast any lung CT scan into a machine-agnostic standard embedding space. A highly accurate segmentation model was developed based on the standard embedding space. To train the model, a novel simulation model was developed, which depicts the dynamic change of infection regions for COVID-19, and this dynamic model was used to augment extra data, which improved the performance of the segmentation model.

The preprocessing method resolves the heterogeneity issue in the data and makes the current method applicable to any dataset generated by any CT machine. The segmentation model finds a good tradeoff between the complexity of the deep learning model and the accuracy of the model. In addition, it indirectly captures and incorporates the regular morphologies of lung tissues, such as lung lobes, pulmonary arteries, veins, and capillaries. This makes the current model both accurate and rapid. It was further observed that the current model can sometimes out-perform human annotations when distinguishing tracheae and blood vessels. The simulation model resolves the commonly-seen data scarcity issue for biomedical imaging tasks, particularly for COVID-19, where high-quality, annotated data are rarely accessible or available. The comprehensive experiments on multi-country, multi-hospital, and multi-machine datasets illustrated in FIGS. 7 to 12 indicate that the current segmentation model has much higher dice, recall, and worst-case performance, and runs much faster than the state-of-the-art methods.

The disdosed embodiments provide a method and system for fully-automatic, accurate, rapid and machine-agnostic detection of COVID-19 based on CT scans. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disdosed herein.

This written description uses examples of the subject matter disdosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

The entire content of the following articles is included herein by reference:

[1] C. Godet, A. Elsendoom, and F. Roblot, "Benefit of CT scanning for assessing pulmonary disease in the immunodepressed patient," Diagn Interv Imaging, vol. 93, no. 6, pp. 425-30, Jun 2012, doi: 10.1016/j.diii.2012.04.001.

[2] N. Garin, C. Marti, M. Scheffler, J. Stimemann, and V. Prendki, "Computed tomography scan contribution to the diagnosis of community-acquired pneumonia," Curr Opin Pulm Med, vol. 25, no. 3, pp. 242-248, May 2019, doi: 10.1097/MCP.0000000000000567.

[3] A. Christe et al., "Computer-Aided Diagnosis of Pulmonary Fibrosis Using Deep Learning and CT Images," Investigative Radiology, vol. 54, no. 10, pp. 627-632, 2019, doi: 10.1097/rli.0000000000000574.

[4] S. L. F. Walsh, L. Calandriello, M. Silva, and N. Sverzellati, "Deep learning for classifying fibrotic lung disease on high-resolution computed tomography: a case-cohort study," Lancet Respir Med, vol. 6, no. 11, pp. 837-845, Nov 2018, doi: 10.1016/S2213-2600(18)30286-8.

[5] M. Anthimopoulos, S. Christodoulidis, L. Ebner, A. Christe, and S. Mougiakakou, "Lung Pattern Classification for Interstitial Lung Diseases Using a Deep Convolutional Neural Network," IEEE Transactions on Medical Imaging, vol. 35, no. 5, pp. 1207-1216, 2016, doi: 10.1109/TMI.2016.2535865.

[6] N. Garin et al., "Rational Use of CT-Scan for the Diagnosis of Pneumonia: Comparative Accuracy of Different Strategies," (in English), J Clin Med, vol. 8, no. 4, Apr 2019, doi: ARTN 514 10.3390/jcm8040514.

[7] A. Bhandary et al., "Deep-leaming framework to detect lung abnormality—A study with chest X-Ray and lung CT scan images," (in English), Pattern Recogn Lett, vol. 129, pp. 271-278, Jan 2020, doi: 10.1016/j.patrec.2019.11.013.

[8] H. J. Koo, S. Lim, J. Choe, S. H. Choi, H. Sung, and K. H. Do, "Radiographic and CT Features of Viral Pneumonia," (in English), Radiographics, vol. 38, no. 3, pp. 719-739, May-Jun 2018, doi: 10.1148/rg.2018170048.

[9] P. Chhikara, P. Singh, P. Gupta, and T. Bhatia, "Deep Convolutional Neural Network with Transfer Learning for Detecting Pneumonia on Chest X-Rays," Singapore, 2020: Springer Singapore, in Advances in Bioinformatics, Multimedia, and Electronics Circuits and Signals, pp. 155-168.

[10] S. P. Garima Verma, "Pneumonia Classification using Deep Learning in Healthcare," International Journal of Innovative Technology and Exploring Engineering (IJITEE), vol. 9, no. 4, pp. 1715-1723, 2020.

[11] D. S. Kermany et al., "Identifying Medical Diagnoses and Treatable Diseases by Image-Based Deep Learning," Cell, vol. 172, no. 5, pp. 1122-1131 e9, Feb. 22 2018, doi: 10.1016/j.cell.2018.02.010.

[12] P. Rajpurkar et al., "CheXNet: Radiologist-Level Pneumonia Detection on Chest X-Rays with Deep Learning," arXiv e-prints, p. arXiv:1711.05225. [Online]. Available: https://ui.adsabs.harvard.edu/abs/2017arXiv171105225R.

[13] A. A. Saraiva et al., "Classification of Images of Childhood Pneumonia using Convolutional Neural Networks," in BIOIMAGING, 2019.

[14] H. X. Bai et al., "Performance of radiologists in differentiating COVID-19 from viral pneumonia on chest CT," Radiology, p. 200823, Mar. 10 2020, doi: 10.1148/radiol.2020200823.

[15] A. Narin, C. Kaya, and Z. Pamuk, "Automatic Detection of Coronavirus Disease (COVID-19) Using X-ray Images and Deep Convolutional Neural arXiv e-prints, p. arXiv-2003.10849. Available at: https://ui.adsabs.harvard.edu/abs/2020arXiv200310849N.

[16] S. Wang et al., "A deep learning algorithm using CT images to screen for Corona Virus Disease (COVID-19)," medRxiv, p. 2020.02.14.20023028, 2020, doi: 10.1101/2020.02.14.20023028.

[17] Y. Song et al., "Deep learning Enables Accurate Diagnosis of Novel Coronavirus (COVID-19) with CT images," medRxiv, p. 2020.02.23.20026930, 2020, doi: 10.1101/2020.02.23.20026930.

[18] X. Xu et al., "Deep Learning System to Screen Coronavirus Disease 2019 Pneumonia," arXiv e-prints, p. arXiv:2002.09334.[Online]. Available: https://ui.adsabs.harvard.edu/abs/2020arXiv200209334X.

[19] F. Shan et al., "Lung Infection Quantification of COVID-19 in CT Images with Deep Learning," arXiv e-prints, p. arXiv-2003.04655.[Online]. Available: https://ui.adsabs.harvard.edu/abs/2020arXiv200304655S.

[20] D. Silver et al., "Mastering the game of go without human knowledge," Nature, vol. 550, no. 7676, p. 354, 2017, doi: 10.1038/nature24270.

[21] Y. Zhou, W. Huang, P. Dong, Y. Xia, and S. Wang, "D-UNet: A dimension-fusion u shape network for chronic stroke lesion segmentation," IEEE/ACM Trans. Comput. Biol. Bioinf., early access, Sep. 6, 2019, doi: 10.1109/TCBB.2019.2939522.

[22] X. Li, H. Chen, X. Qi, Q. Dou, C.-W. Fu, and P.-A. Heng, "H-DenseUNet: Hybrid densely connected UNet for liver and tumor segmentation from CT volumes," IEEETrans.Med.Imag,. vol. 37, no. 12, pp. 2663-2674, Dec. 2018.

[23] J. Maria Jose V., R. Yasarla, P. Wang, I. Hacihaliloglu, and V. M. Patel, "Learning to segment brain anatomy from 2D ultra-sound with less data," 2019, arXiv-1912.08364. [Online]. Available: http://arxiv.org/abs/1912.08364.

[24] M. Perslev, E. B. Dam, A. Pai, and C. Igel, "One network to segment them all: A general, lightweight system for accurate 3D medical image segmentation," 2019, arXiv-1911.01764. [Online]. Available: http://arxiv.org/abs/1911.01764.

[25] Ö. Çiçek, A. Abdulkadir, S. S. Lienkamp, T. Brox, and O.Ronneberger, "3D U-net: Learning dense volumetric segmentation from sparse annotation," 2016, arXiv-1606.06650. [Online]. Available: http://arxiv.org/abs/1606.06650.

[26] F. Milletari, N. Navab, and S.-A. Ahmadi, "V-net Fully convolutional neural networks for volumetric medical image segmentation," in Proc. 4th Int. Conf. 3D Vis. (3DV), Oct. 2016, pp. 565-571.

What is claimed is:

1. A machine-agnostic segmentation and quantification method for coronavirus diagnostic, the method comprising:

receiving computer tomograph, CT, raw scans;

normalizing the CT raw scans to obtain normalized data $\mathcal{S}$, wherein the normalized data $\mathcal{S}$ is normalized in terms of dimension, resolution, and signal intensity;

generating augmented data based on (1) the CT raw scans and (2) a dynamic simulation model that simulates a progression of infection regions over time, wherein the dynamic simulation model uses a state ψ and a transition function T, the state ψ includes the normalized data $\mathcal{S}$ and an infection mask $\mathcal{M}$, and the transition function T includes a normalized data transition function T $\mathcal{S}$ that is applied to the normalized data $\mathcal{S}$, and an infection mask transition function T $\mathcal{M}$ that is applied to the infection mask $\mathcal{M}$, respectively, and the transition function Tis applied to the state ψ to generate the augmented data;

segmenting three different 2-dimensional, 2D, images from the normalized data $\mathcal{S}$, which correspond to a same voxel, $s$, using three functions $f_{xy}^{s}$, $f_{yz}^{s}$, and $f_{xz}^{s}$, respectively; and quantizing each voxel $s$ to have a value of 0 or 1, based on (1) summing up outputs of the three functions $f_{xy}^{s}$, $f_{yz}^{s}$, and $f_{xz}^{s}$, applying a nixed threshold, and (2) an aggregation function g, wherein the value 0 indicates that the voxel is not infected with the coronavirus, and the value 1 indicates that the voxel is infected with the coronavirus, and wherein the three functions $f_{xy}^{s}$, $f_{yz}^{s}$, and $f_{xz}^{s}$ are independent functions trained independently based on the augmented data.

2. The method of claim 1, wherein the step of normalization is performed for each voxel.

3. The method of claim 1, wherein the step of normalization simultaneously normalizes the dimension, resolution and signal intensity.

4. The method of claim 1, wherein the dynamic simulation model uses the state ψ and a Markov property.

5. The method of claim 1, further comprising:

fitting plural parameters W of the simulation model on the CT raw scans.

6. The method of claim 1, wherein the step of segmenting further comprises:

inputting to each of the three functions $f_{xy}^{s}$, $f_{yz}^{s}$, and $f_{xz}^{s}$, in addition to the corresponding 2D image of the same voxel, at least one extra image which is not part of the voxel.

7. The method of claim 6, wherein the at least one extra image is located a given distance away from the voxel.

8. The method of claim 1, wherein each of the three functions $f_{xy}^{s}$, $f_{yz}^{s}$, and $f_{xz}^{s}$ is a U-net function.

9. A computing device that is machine-agnostic when segmenting and quantifying data for coronavirus diagnostic, the computing device comprising:

an interface configured to receive computer tomograph, CT, raw scans; and a processor connected to the interface and configured to, normalize the CT raw scans to obtain normalized data $\mathcal{S}$, wherein the normalized data $\mathcal{S}$ is normalized in terms of dimension, resolution, and signal intensity;

generate augmented data based on (1) the CT raw scans and (2) a dynamic simulation model that simulates a progression of infection regions over time, wherein the dynamic simulation model uses a state ψ and a transition function T, the state ψ includes the normalized data $\mathcal{S}$ and an infection mask $\mathcal{M}$, and the transition function T includes a normalized data transition function T $\mathcal{S}$ that is applied to the normalized data $\mathcal{S}$, and an infection mask transition function T $\mathcal{M}$ that is applied to the infection mask $\mathcal{M}$, respectively, and the transition function T is applied to the state Y to generate the augmented data;

segment three different 2-dimensional, 2D, images from the normalized data $\mathcal{S}$, which correspond to a same voxel, $s$, using three functions $f_{xy}^{s}$, $f_{yz}^{s}$, and $f_{xz}^{s}$, respectively; and quantize each voxel $s$ to have a value of 0 or 1, based on (1) summing up outputs of the three functions $f_{xy}^{s}$, $f_{yz}^{s}$, and $f_{xy}^{s}$, $f_{yz}^{s}$, applying a fixed threshold, and (2) an aggregation function g, wherein the value 0 indicates that the voxel is not infected with the coronavirus, and the value 1 indicates that the voxel is infected with the coronavirus, and wherein the three functions $f_{xy}^{s}$, $f_{yz}^{s}$, and $f_{xz}^{s}$ are independent functions trained independently based on the augmented data.

10. The computing device of claim 9, wherein the processor is configured to simultaneously normalizes the dimension, resolution and signal intensity.

11. The computing device of claim 9, wherein the dynamic simulation model uses the state ψ and a Markov property.

12. The computing device of claim 11, wherein the processor is further configured to:

fit plural parameters W of the simulation model on the CT raw scans.

13. The computing device of claim 9, wherein the processor is further configured to:

input to each of the three functions $f_{xy}^{s}$, $f_{yz}^{s}$, and $f_{xz}^{s}$, in addition to the corresponding 2D image of the same voxel, at least one extra image which is not part of the voxel.

14. The computing device of claim 13, wherein the at least one extra image is a given distance away from the voxel.

15. The computing device of claim 9, wherein each of the three functions $f_{xy}^{s}$, $f_{yz}^{s}$, and $f_{xz}^{s}$ is a U-net function.

16. A non-transitory computer readable medium including computer executable instructions, wherein the instructions, when executed by a computer, implement a machine-agnostic segmentation and quantification method for coronavirus diagnostic, the method comprising:

receiving computer tomograph, CT, raw scans;

normalizing the CT raw scans to obtain normalized data $\mathcal{S}$, wherein the normalized data $\mathcal{S}$ is normalized in terms of dimension, resolution, and signal intensity;

generating augmented data based on (1) the CT raw scans and (2) a dynamic simulation model that simulates a progression of infection regions over time, wherein the dynamic simulation model uses a state ψ and a transition function T, the state ψ includes the normalized data $\mathcal{S}$ and an infection mask $\mathcal{M}$, and the transition function T includes a normalized data transition function T $\mathcal{S}$ that is applied to the normalized data $\mathcal{S}$, and an infection mask transition function T $\mathcal{M}$ that is applied to the infection mask $\mathcal{M}$, respectively, and the transition function T is applied to the state ψ to generate the augmented data;

segmenting three different 2-dimensional, 2D, images from the normalized data, which correspond to a same voxel, $s$, using three functions $f_{xy}^{s}$, $f_{yz}^{s}$, and $f_{xz}^{s}$, respectively; and quantizing each voxel $s$ to have a value of 0 or 1, based on (1) summing up outputs of the three functions $f_{xy}^{s}$, $f_{yz}^{s}$, and $f_{xz}^{s}$, and applying a nixed threshold, and (2) an aggregation function g, wherein the value 0 indicates that the voxel is not infected with the coronavirus, and the value 1 indicates that the voxel is infected with the coronavirus, and wherein the three functions $f_{xy}^{s}$, $f_{yz}^{s}$, and $f_{xz}^{s}$ are independent functions trained independently based on the augmented data.

* * * * *